US011942035B2

(12) United States Patent
Zhang et al.

(10) Patent No.: US 11,942,035 B2
(45) Date of Patent: Mar. 26, 2024

(54) DISPLAY PANEL, METHOD FOR DRIVING DISPLAY PANEL, AND DISPLAY DEVICE

(71) Applicants: WUHAN TIANMA MICROELECTRONICS CO., LTD., Wuhan (CN); WUHAN TIANMA MICROELECTRONICS CO., LTD. SHANGHAI BRANCH, Shanghai (CN)

(72) Inventors: Mengmeng Zhang, Wuhan (CN); Yue Li, Wuhan (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 18/045,311

(22) Filed: Oct. 10, 2022

(65) Prior Publication Data

US 2023/0111763 A1 Apr. 13, 2023

(30) Foreign Application Priority Data

Jun. 29, 2022 (CN) ......................... 202210757542.8

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0842* (2013.01);
(Continued)

(58) Field of Classification Search
None
See application file for complete search history.

(56) References Cited

U.S. PATENT DOCUMENTS 6,195,077 B1 * 2/2001 Gyouten .............. G09G 3/3692 345/204
7,164,405 B1 * 1/2007 Jeong ................... G09G 3/3688 345/94
(Continued)

FOREIGN PATENT DOCUMENTS

CN 110176215 B 1/2021
CN 112201208 A 1/2021

*Primary Examiner* — Dorothy Harris
(74) *Attorney, Agent, or Firm* — CHRISTENSEN O'CONNOR JOHNSON KINDNESS PLLC

(57) ABSTRACT

A display panel, a method for driving a display panel, and a display device are provided. A first scanning driving unit is electrically connected to first scanning control terminals of first and second pixel driving circuits. A working cycle of the pixel driving circuit includes a data writing phase. The data writing phase of the first pixel driving circuit is prior to the data writing phase of the second pixel driving circuit in a display duration of one frame of an image. When the first pixel driving circuit and the second pixel driving circuit receive a same data voltage, a potential $V_{N11}$ of the first node in the first pixel driving circuit after the data writing phase of the first pixel driving circuit is greater than a potential $V_{N12}$ of the first node in the second pixel driving circuit after the data writing phase of the second pixel driving circuit.

15 Claims, 16 Drawing Sheets

(52) U.S. Cl.
CPC . *G09G 2310/08* (2013.01); *G09G 2320/0233* (2013.01); *G09G 2330/021* (2013.01)

(56) References Cited

U.S. PATENT DOCUMENTS

| | | | | |
|---|---|---|---|---|
| 2005/0264500 | A1* | 12/2005 | Shirasaki ............. | G09G 3/3225 345/77 |
| 2006/0103323 | A1* | 5/2006 | Eom .................... | G09G 3/3266 315/169.3 |
| 2011/0109612 | A1* | 5/2011 | Chaji ................... | G09G 3/3283 345/211 |
| 2014/0333513 | A1* | 11/2014 | Park ..................... | G09G 3/3266 345/76 |
| 2015/0002560 | A1* | 1/2015 | Kwon .................. | G09G 3/3266 345/691 |
| 2021/0183328 | A1* | 6/2021 | Taniguchi ............ | G09G 3/3266 |

* cited by examiner

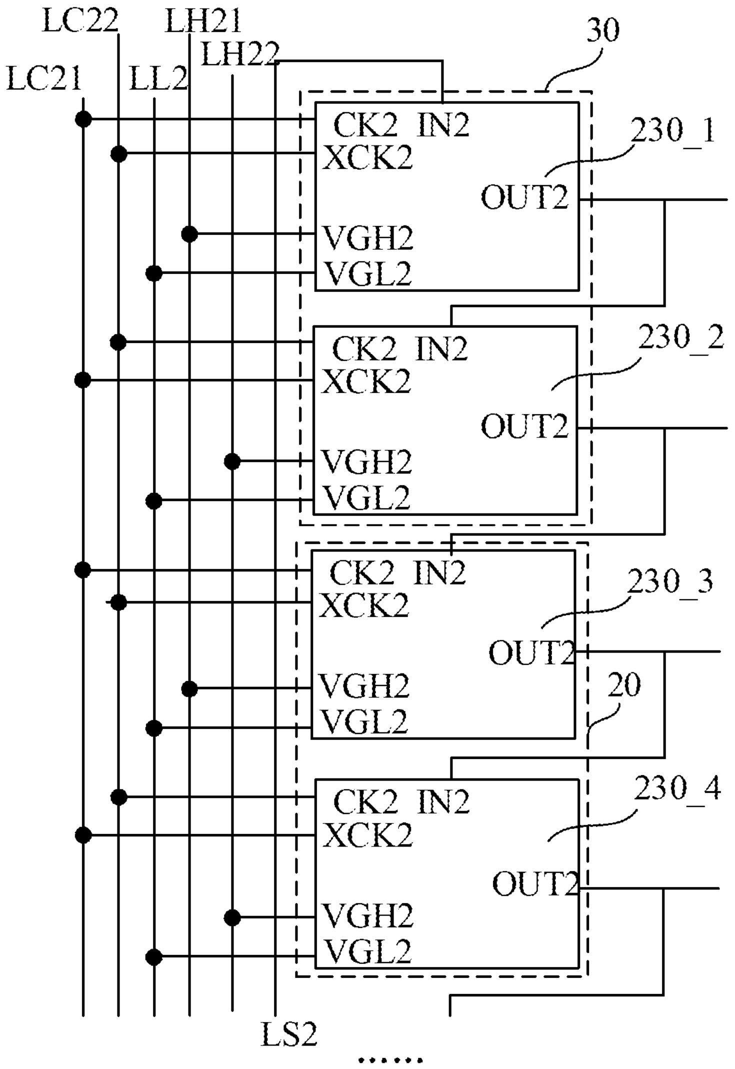

FIG. 18

Controlling a data writing phase of a first pixel driving circuit to be prior to a data writing phase of a second pixel driving circuit in a display duration of a frame of an image; and in a case where the first pixel driving circuit and the second pixel driving circuit receive a same data voltage, controlling a potential $V_{N11}$ of a first node in the first pixel driving circuit after the data writing phase of the first pixel driving circuit to be greater than a potential $V_{N12}$ of a first node in the second pixel driving circuit after the data writing phase of the second pixel driving circuit

FIG. 19

Controlling a data writing phase of a first pixel driving circuit to be prior to a data writing phase of a second pixel driving circuit in a display duration of a frame of an image; and in a case where the first pixel driving circuit and the second pixel driving circuit receive a same data voltage, controlling a current leaking speed $v_{N11}$ at a first node in the first pixel driving circuit after the data writing phase of the first pixel driving circuit to be smaller than a current leaking speed $v_{N12}$ at a first node in a second pixel driving circuit after the data writing phase of the second pixel driving circuit

FIG. 20

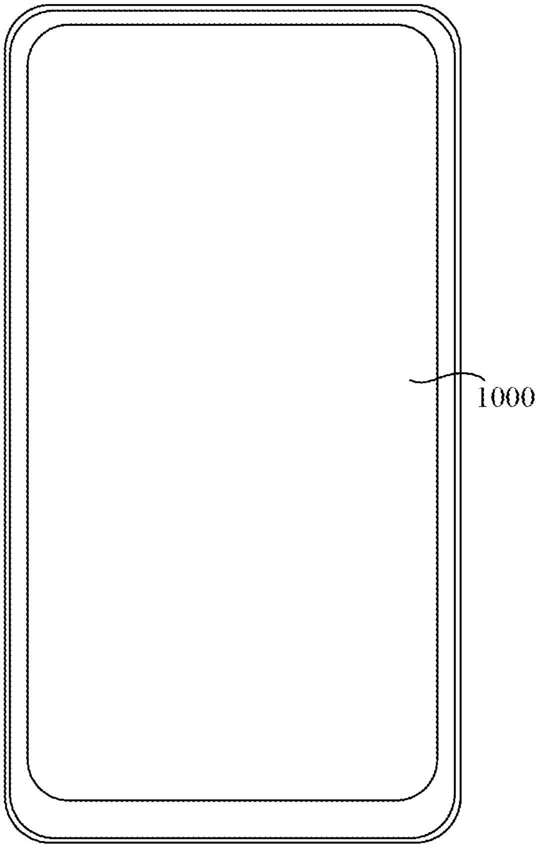

FIG. 21

DISPLAY PANEL, METHOD FOR DRIVING DISPLAY PANEL, AND DISPLAY DEVICE

CROSS-REFERENCE TO RELATED APPLICATIONS

The present application claims priority to Chinese Patent Application No. 202210757542.8, filed on Jun. 29, 2022, the content of which is incorporated herein by reference in its entirety.

TECHNICAL FIELD

The present disclosure relates to the field of display technologies, and in particular, to a display panel, a method for driving a display panel, and a display device.

BACKGROUND

Organic light-emitting diode (OLED) display panels have gradually become a main display technology for mobile phones, TVs, computers, and other displays due to its characteristics, such as self-luminescence, fast response, wide color gamut, large viewing angle, and high brightness of the OLED display panel.

OLED display panels include multiple sub-pixels in a display area, and driving circuits in a non-display area for driving the sub-pixels to be lit up. In the related art, the display panel has problems that an area of the non-display area is too large, and a brightness uniformity of the display area is poor during display.

SUMMARY

In a first aspect, some embodiments of the present disclosure provide a display panel. The display panel includes pixel groups and first scanning driving units. Each pixel group of the pixel groups includes B pixel rows, where B≥2, and B is an integer. Each pixel row of the B pixel rows includes pixel driving circuits. Each pixel driving circuit of the pixel driving circuits includes a driving transistor, a data writing control terminal, and a first scanning control terminal. A control electrode of the driving transistor is electrically connected to a first node, and a first electrode of the driving transistor is electrically connected to a second node. One first scanning driving unit of the first scanning driving units is electrically connected to the first scanning control terminals of the pixel driving circuits in one of the pixel groups. A working cycle of each pixel driving circuit of the pixel driving circuits includes a data writing phase. During the data writing phase, the data writing control terminal is configured to receive an effective level, and the one first scanning driving unit of first scanning driving units is configured to provide an effective level to the first scanning control terminals. The pixel driving circuits in one pixel group of the pixel groups include a first pixel driving circuit and a second pixel driving circuit. In a display duration of a frame of an image, the data writing phase of the first pixel driving circuit is prior to the data writing phase of the second pixel driving circuit, and in a case where the first pixel driving circuit and the second pixel driving circuit receive a same data voltage, a potential $V_{N11}$ of the first node in the first pixel driving circuit after the data writing phase of the first pixel driving circuit is greater than a potential $V_{N12}$ of the first node in the second pixel driving circuit after the data writing phase of the second pixel driving circuit.

In a second aspect, some embodiments of the present disclosure provide a display panel. The display panel includes pixel groups and first scanning driving units. Each of the pixel groups includes B pixel rows, where B≥2, and B is an integer. Each pixel row of the B pixel rows includes pixel driving circuits. Each pixel driving circuit of the pixel driving circuits includes a driving transistor, a data writing control terminal, and a first scanning control terminal. A control electrode of the driving transistor is electrically connected to a first node, and a first electrode of the driving transistor is electrically connected to a second node. One first scanning driving unit of the first scanning driving units is electrically connected to the first scanning control terminals of the pixel driving circuits in one of the pixel groups. A working cycle of each pixel driving circuit of the pixel driving circuits includes a data writing phase. During the data writing phase, the data writing control terminal is configured to receive an effective level, and the one first scanning driving unit of first scanning driving units is configured to provide an effective level. The pixel driving circuits in one pixel group of the pixel groups include a first pixel driving circuit and a second pixel driving circuit. In a display duration of a frame of an image, the data writing phase of the first pixel driving circuit is prior to the data writing phase of the second pixel driving circuit; and in a case where the first pixel driving circuit and the second pixel driving circuit receive a same data voltage, a current leaking speed at the first node in the first pixel driving circuit is $v_{N11}$ after the data writing phase of the first pixel driving circuit, and a current leaking speed at the first node in the second pixel driving circuit is $v_{N12}$ after the data writing phase of the second pixel driving circuit, where $v_{N11}<v_{N12}$.

In a third aspect, some embodiments of the present disclosure provide a method for driving a display panel. The display panel includes pixel groups and first scanning driving units. Each of the pixel groups includes B pixel rows, where B≥2, and B is an integer. Each pixel row of the B pixel rows includes pixel driving circuits. Each pixel driving circuit of the pixel driving circuits includes a driving transistor, a data writing control terminal, and a first scanning control terminal. A control electrode of the driving transistor is electrically connected to a first node, and a first electrode of the driving transistor is electrically connected to a second node. One first scanning driving unit of the first scanning driving units is electrically connected to the first scanning control terminals of the pixel driving circuits in one of the pixel groups. A working cycle of each of the pixel driving circuits includes a data writing phase. During the data writing phase, the data writing control terminal is configured to receive an effective level, and the one first scanning driving unit is configured to provide an effective level to the first scanning control terminal. The pixel driving circuits in one pixel group of the pixel groups include a first pixel driving circuit and a second pixel driving circuit. The method includes: controlling the data writing phase of the first pixel driving circuit to be prior to the data writing phase of the second pixel driving circuit in the display duration of the one frame of the image, and in a case where the first pixel driving circuit and the second pixel driving circuit receive a same data voltage, controlling a potential $V_{N11}$ of the first node in the first pixel driving circuit after the data writing phase of the first pixel driving circuit to be greater than a potential $V_{N12}$ of the first node in the second pixel driving circuit after the data writing phase of the second pixel driving circuit.

In a fourth aspect, some embodiments of the present disclosure provide a method for driving a display panel. The display panel includes pixel groups and first scanning driving units. Each pixel group of the pixel groups includes B pixel rows, where B≥2, and B is an integer. Each pixel row of the B pixel rows includes pixel driving circuits. Each pixel driving circuit of the pixel driving circuits includes a driving transistor, a data writing control terminal, and a first scanning control terminal. A control electrode of the driving transistor is electrically connected to a first node, and a first electrode of the driving transistor is electrically connected to a second node. One first scanning driving unit of the first scanning driving units is electrically connected to the first scanning control terminals of the pixel driving circuits in one of the pixel groups. A working cycle of each pixel driving circuit of the pixel driving circuits includes a data writing phase. During the data writing phase, the data writing control terminal is configured to receive an effective level, and the one first scanning driving unit of first scanning driving units is configured to provide an effective level. The pixel driving circuits in one pixel group of the pixel groups include a first pixel driving circuit and a second pixel driving circuit. The method includes: in a display duration of a frame of an image, controlling the data writing phase of the first pixel driving circuit to be prior to the data writing phase of the second pixel driving circuit; and in a case where the first pixel driving circuit and the second pixel driving circuit receive a same data voltage, controlling a current leaking speed $v_{N11}$ at the first node in the first pixel driving circuit after the data writing phase of the first pixel driving circuit to be smaller than a current leaking speed $v_{N12}$ at the first node in the second pixel driving circuit after the data writing phase of the second pixel driving circuit.

In a fifth aspect, some embodiments of the present disclosure provide a display device including the display panel described above.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

FIG. 18 is a schematic connection diagram of a light-emitting driving circuit according to an embodiment of the present disclosure;

FIG. 19 is a schematic diagram of a method for driving a display panel according to an embodiment of the present disclosure;

FIG. 20 is a schematic diagram of another method for driving a display panel according to an embodiment of the present disclosure; and FIG. 21 is a schematic diagram of a display device according to an embodiment of the present disclosure.

DESCRIPTION OF EMBODIMENTS

In order to better understand technical solutions of the present disclosure, the embodiments of the present disclosure are described in detail with reference to the drawings.

It should be clear that the described embodiments are merely some embodiments of the embodiments of the present disclosure rather than all of the embodiments. All other embodiments obtained by those skilled in the art shall fall into the protection scope of the present disclosure.

The terms used in the embodiments of the present disclosure are merely describing exemplary embodiments and not intended to limit the present disclosure. Unless otherwise noted in the context, the expressions "a", "an" and "the" in singular form in the embodiments and appended claims of the present disclosure are also intended to represent a plural form.

It should be understood that the term "and/or" used in this disclosure is only an association relationship to describe associated objects, which indicates that there may be three relationships. For example, A and/or B may indicate A alone, both A and B, and B alone. In addition, the character "/" in this disclosure generally indicates that the related objects have an "or" relationship.

It should be understood that although the terms first, second, or the like may be used to describe the pixel driving circuits in the embodiments of the present disclosure, these pixel driving circuits should not be limited by these terms. These terms are only used to distinguish the pixel driving circuits located in different pixel rows from each other. For example, without departing from the scope of the embodiments of the present disclosure, the first pixel driving circuit may also be referred to as a second pixel driving circuit, and similarly, a second pixel driving circuit may also be referred to as a first pixel driving circuit.

Figure 1:
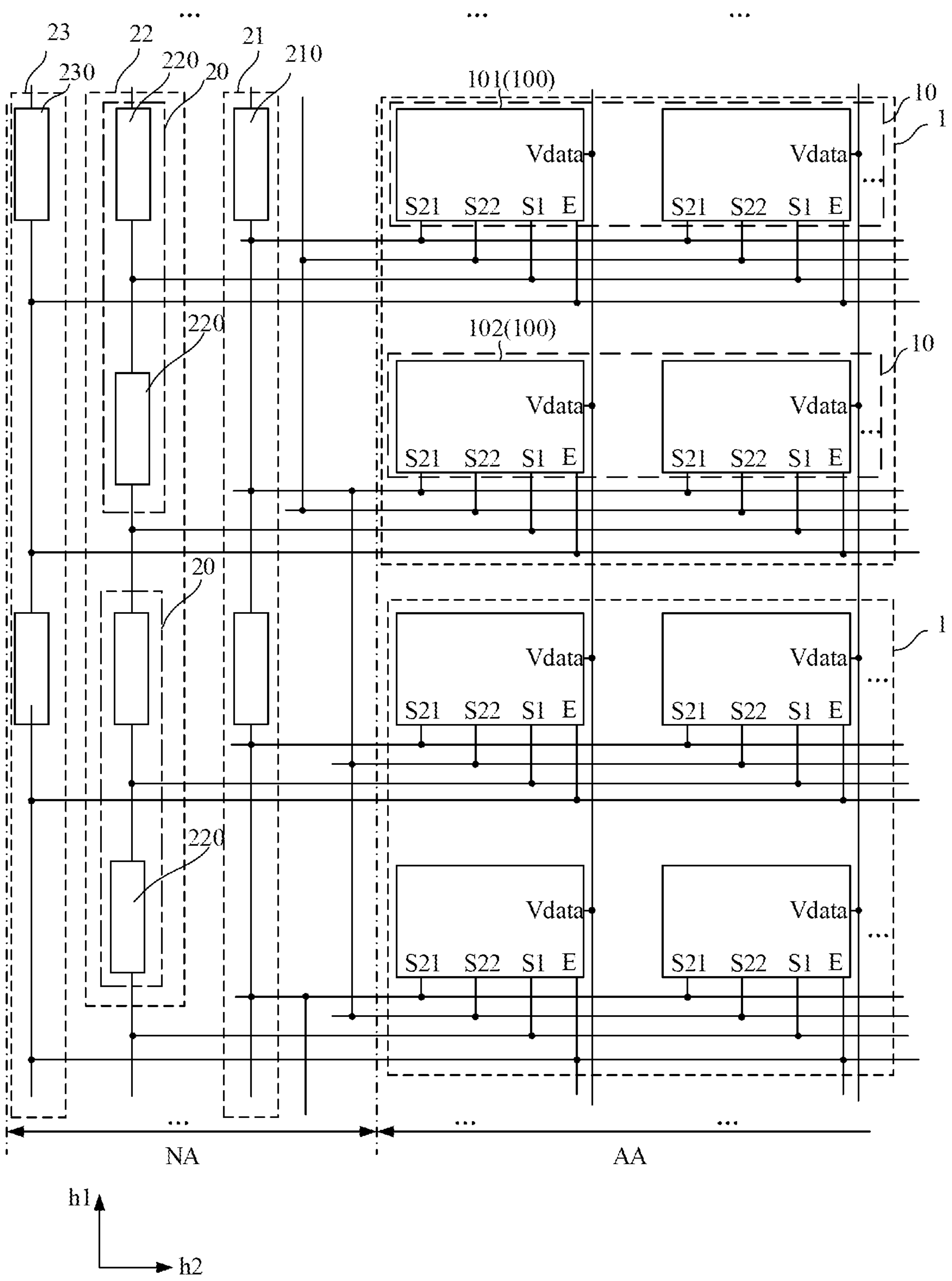
FIG. 1 is a schematic diagram of a partial area of a display panel according to an embodiment of the present disclosure.

An embodiment of the present disclosure provides a display panel, as shown in FIG. 1, which is a schematic diagram of a partial area of a display panel according to an embodiment of the present disclosure. The display panel includes a display area AA and a non-display area NA. The display panel includes multiple pixel groups 1 arranged along a first direction h1 in the display area AA, the pixel group 1 includes B pixel rows 10 arranged along the first direction h1, where B≥2, and B is an integer. The pixel row 10 includes multiple pixel driving circuits 100 arranged along a second direction h2. In FIG. 1, B=2 is taken as an example, that is, one pixel group 1 includes two pixel rows 10, where one pixel row 10 includes a first pixel driving circuit 101, and another pixel row 10 includes a second pixel driving circuit 102.

Figure 2:
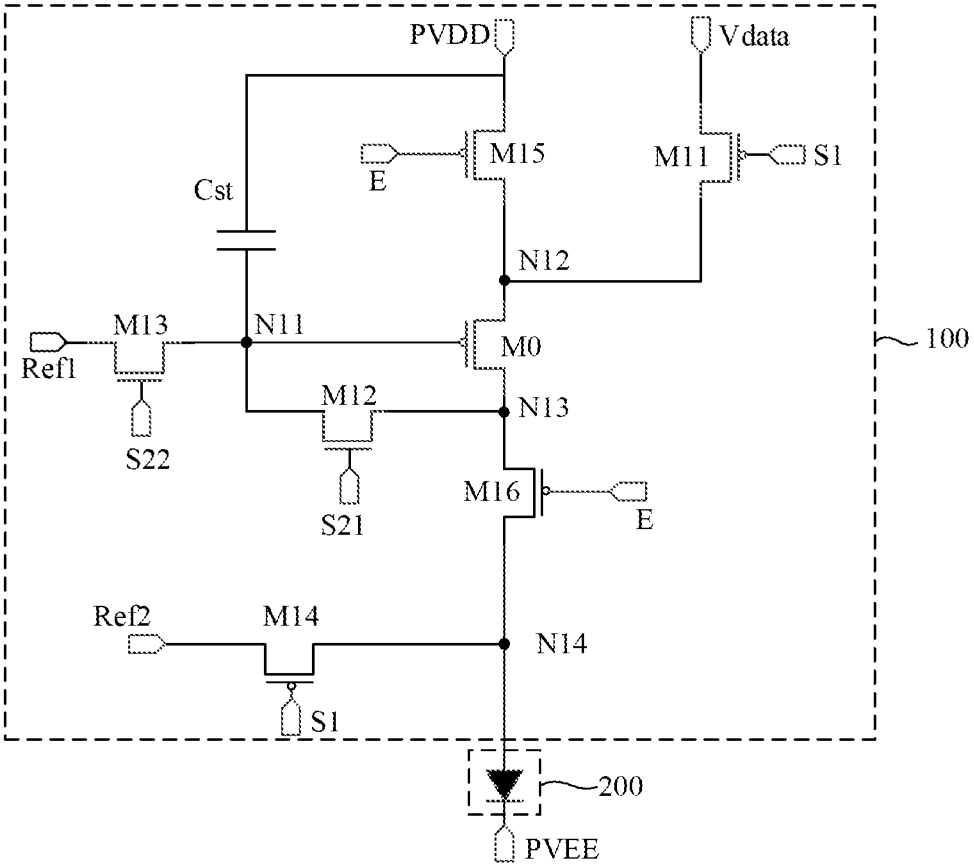
FIG. 2 is a schematic diagram of a pixel driving circuit according to an embodiment of the present disclosure.

As shown in FIG. 2, which is a schematic diagram of a pixel driving circuit according to an embodiment of the present disclosure, the pixel driving circuit 100 includes a driving transistor M0, a data writing transistor M11, a threshold compensation transistor M12, a first node reset transistor M13, a light-emitting element reset transistor M14, a second light-emitting control transistor M15, a first light-emitting control transistor M16, and a storage capacitor Cst. A control electrode of the driving transistor M0 is electrically connected to a first node N11, a first electrode of the driving transistor M0 is electrically connected to a second node N12, and a second electrode of the driving transistor M0 is electrically connected to a third node N13. A control electrode of the data writing transistor M11 is electrically connected to a data writing control terminal S1, a first electrode of the data writing transistor M11 is electrically connected to a data voltage terminal Vdata, and a second electrode of the data writing transistor M11 is electrically connected to the second node N12. A control electrode of the threshold compensation transistor M12 is electrically connected to a first scanning control terminal S21, a first electrode of the threshold compensation transistor M12 is electrically connected to the third node N13, and a second electrode of the threshold compensation transistor M12 is electrically connected to the first node N11. A control electrode of the first node reset transistor M13 is electrically connected to a second scanning control terminal S22, a first electrode of the first node reset transistor M13 is electrically connected to a first reset terminal Ref1, and a second electrode of the first node reset transistor M13 is electrically connected to the first node N11. A control electrode of the light-emitting element reset transistor M14 is electrically connected to the data writing control terminal S1, a first electrode of the light-emitting element reset transistor M14 is electrically connected to a second reset terminal Ref2, and a second electrode of the light-emitting element reset transistor M14 is electrically connected to a fourth node N14. A control electrode of the first light-emitting control transistor M16 is electrically connected to a light-emitting control terminal E, a first electrode of the first light-emitting control transistor M16 is electrically connected to the third node N13, and a second electrode of the first light-emitting control transistor M16 is electrically connected to the fourth node N14. A control electrode of the second light-emitting control transistor M15 is electrically connected to the light-emitting control terminal E, a first electrode of the second light-emitting control transistor M15 is electrically connected to a first power supply voltage terminal PVDD, and a second electrode of the second light-emitting control transistor M15 is electrically connected to the second node N12. A first plate of the storage capacitor Cst is electrically connected to the first node N11, and a second plate of the storage capacitor Cst is electrically connected to the first power supply voltage terminal PVDD. One electrode of a light-emitting element 200 is electrically connected to the fourth node N14, and another electrode of the light-emitting element 200 is electrically connected to a second power supply voltage terminal PVEE.

In some embodiments of the disclosure, the first node reset transistor M13 and the threshold compensation transistor M12 may be oxide transistors, for example, indium gallium zinc oxide (IGZO) transistors, so that the first node reset transistor M13 and the threshold compensation transistor M12 have a small off-state leakage current, which improves a potential stability of the first node N11. For example, when the display panel display images in a low frequency mode, a potential of the first node N11 is maintained for a long time, setting the first node reset transistor M13 and the threshold compensation transistor M12 that are electrically connected to the first node N11 to be Indium Gallium Zinc Oxide transistors can ensure a brightness uniformity of low frequency display.

Figure 3:
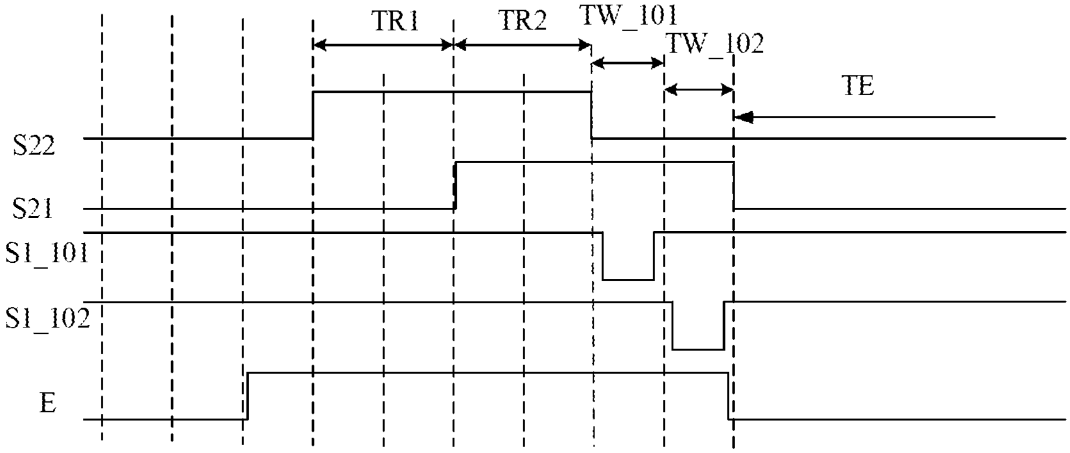
FIG. 3 is a working timing sequence of a first pixel driving circuit and a second pixel driving circuit according to an embodiment of the present disclosure.

When the display panel is displaying an image, as shown in FIG. 2 and FIG. 3, FIG. 3 is a working timing sequence of a first pixel driving circuit and a second pixel driving circuit according to an embodiment of the present disclosure. A working cycle of each of the first pixel driving circuit 101 and the second pixel driving circuit 102 includes a first reset phase TR1, a data writing phase and a light-emitting phase TE. TW_101 in FIG. 3 represents the data writing phase of the first pixel driving circuit 101, and TW_102 represents the data writing phase of the second pixel driving circuit 102.

During the first reset phase TR1, the second scanning control terminals S22 control the first node reset transistors M13 of the first pixel driving circuit 101 and the second pixel driving circuit 102 to be turned on, and the first reset terminals Ref1 reset the first nodes N11 of the first pixel driving circuit 101 and the second pixel driving circuit 102 by the first node reset transistors M13.

During the data writing phase TW_101 of the first pixel driving circuit 101, the data writing control terminal S1 of the first pixel driving circuit 101 controls the data writing transistor M11 of the first pixel driving circuit 101 to be turned on, and a data voltage $V_{data}$ provided by the data voltage terminal Vdata of the first pixel driving circuit 101 is written into the second node N12 of the first pixel driving circuit 101 through the data writing transistor M11 of the first pixel driving circuit 101. The driving transistor M0 of the first pixel driving circuit 101 is turned on. At this phase, the first scanning control terminal S21 of the first pixel driving circuit 101 controls the threshold compensation transistor M12 of the first pixel driving circuit 101 to be turned on. During this process, a potential of the first node N11 of the first pixel driving circuit 101 changes continuously until the potential $V_{N11}$ of the first node N11 of the first pixel driving circuit 101 changes to $V_{N11}=V_{data}-|V_{th1}|$, $V_{th1}$ is a threshold voltage the driving transistor M0 of the first pixel driving circuit 101.

During the data writing phase TW_102 of the second pixel driving circuit 102, the data writing control terminal S1 of the second pixel driving circuit 102 controls the data writing transistor M11 of the second pixel driving circuit 102 to be turned on, and a data voltage $V_{data}$ provided by the data voltage terminal $V_{data}$ of the second pixel driving circuit 102 is written into the second node N12 of the second pixel driving circuit 102 through the data writing transistor M11. The driving transistor M0 of the second pixel driving circuit 102 is turned on. At this phase, the first scanning control terminal S21 of the second pixel driving circuit 102 controls the threshold compensation transistor M12 of the second pixel driving circuit 102 to be turned on. During this process, a potential of the first node N11 of the second pixel driving circuit 102 changes continuously until the potential $V_{N11}$ of the first node N11 of the second pixel driving circuit 102 changes to $V_{N11}=V^{data}-|V_{th2}|$, $V_{th2}$ is a threshold voltage the driving transistor M0 of the second pixel driving circuit 102.

During the light-emitting phase TE, the second light-emitting control transistors M15, the first light-emitting control transistors M16 and the driving transistors M0 of the first pixel driving circuit 101 and the second pixel driving circuit 102 are turned on, and the first node reset transistors M13 and the data writing transistors M11 and the threshold compensation transistors M12 of the first pixel driving circuit 101 and the second pixel driving circuit 102 are turned off, a current path between the first power supply voltage terminal PVDD and the second power supply voltage terminal PVEE in each of the first pixel driving circuit 101 and the second pixel driving circuit 102 is turned on, and the light-emitting elements 200 electrically connected to the first pixel driving circuit 101 and the second pixel driving circuit 102 are lit up.

As shown in FIG. 1, the display panel further includes a first scanning driving circuit 21, a second scanning driving circuit 22, and a light-emitting driving circuit 23.

The first scanning driving circuit 21 includes multiple cascaded first scanning driving units 210, and the first scanning driving unit 210 is electrically connected to the first scanning control terminals S21 of the multiple pixel rows 10 in a same pixel group 1.

The second scanning driving circuit 22 includes multiple cascaded second scanning driving unit groups 20, and the second scanning driving unit group 20 includes B cascaded second scanning driving units 220. Multiple cascaded second scanning driving unit groups 20 means that an output terminal of a last stage second scanning driving unit 220 in a previous second scanning driving unit group 20 is electrically connected to an input terminal of a first stage second scanning driving unit 220 in a current second scanning driving unit group 20. The second scanning driving unit groups 20 are arranged corresponding to the pixel groups 1, and B cascaded second scanning driving units 220 in a same second scanning driving unit group 20 are electrically connected to B pixel rows 10 in a same pixel group 1 in one-to-one correspondence. The second scanning driving unit 220 is electrically connected to the data writing control terminal S1 of the pixel driving circuit 100. When the display panel is in operation, the second scanning driving units 220*s* in all stages output an effective level signal successively, so that pixel rows 10 perform a data writing operation successively.

In some embodiments, where the multiple pixel driving circuits 100 in a same pixel group 1 include the above-mentioned first pixel driving circuits 101 and the second pixel driving circuits 102 located in different pixel rows, in the display duration of the frame of the image, as shown in FIG. 3, effective levels of the first scanning control terminals S21 of the first pixel driving circuit 101 and the second pixel driving circuit 102 cover the data writing phase TW_101 of the first pixel driving circuit 101 and the data writing phase TW_102 of the second pixel driving circuit 102. The data writing phase TW_101 of the first pixel driving circuit 101 is prior to the data writing phase TW_102 of the second pixel driving circuit 102. In a case where the first pixel driving circuit 101 and the second pixel driving circuit 102 receive a same data voltage, a potential of the first node N11 in the first pixel driving circuit 101 after the data writing phase TW_101 of the first pixel driving circuit 101 is $V_{N11}$, and a potential of the first node N11 in the second pixel driving circuit 102 after the data writing phase TW_102 of the second pixel driving circuit 102 is $V_{N12}$. In some embodiments of the present disclosure, $V_{N11}>V_{N12}$.

In some embodiments, the first scanning driving unit 210 is electrically connected to multiple the first scanning control terminals S21 in a same pixel group 1, in this way, the number of the first scanning driving units 210 required by the display panel can be reduced, thereby reducing a space occupied by the first scanning driving circuit 21 in the non-display area NA, which is beneficial to improve a screen ratio of the display panel.

When the second pixel driving circuit 102 performs the data writing operation, that is, in the data writing phase TW_102 corresponding to the second pixel driving circuit 102, the threshold compensation transistor M12 of the first pixel driving circuit 101 is still turned on. Since the fourth node N14 is electrically connected to the second reset terminal Ref2 through the light-emitting element reset transistor M14, the second reset terminal Ref2 provides a low-level reset signal. Therefore, during this phase, the first node N11 of the first pixel driving circuit 101 leaks current to the fourth node N14 through the third node N13 and the first light-emitting control transistor M16 until the threshold compensation transistor M12 of the first pixel driving circuit 101 is turned off. A duration from a time point when the data writing transistor M11 of the pixel driving circuit 100 is turned off to a time point when the threshold compensation transistor M12 is turned off, is defined as a current leakage duration of the first node N1. As mentioned above, the effective levels of the first scanning control terminals S21 of the first pixel driving circuit 101 and the second pixel driving circuit 102 cover the data writing phase TW_101 and the data writing phase TW_102, and the data writing phase TW_101 of the first pixel driving circuit 101 is prior to the data writing phase TW_102 of the second pixel driving circuit 102. Therefore, the current leakage duration of the first node N11 in the first pixel driving circuit 101 is greater than the current leakage duration of the first node N11 in the second pixel driving circuit 102.

In some embodiments, first pixel driving circuit 101 and the second pixel driving circuit 102 receive a same data voltage, after the data writing phase of the first pixel driving circuit 101 and the data writing phase of the second pixel driving circuit 102, that is, when the data writing transistor M11 of the first pixel driving circuit 101 and the data writing transistor M11 of the second pixel driving circuit 102 are turned off, by setting $V_{N11}>V_{N12}$ in the embodiments of the disclosure. In such embodiments, a difference between a current leakage duration of the first node N11 in the first pixel driving circuit 101 and a current leakage duration of the first node N11 in the second pixel driving circuit 102 can be compensated or even eliminated. After entering a light-emitting phase, the potential of the first node N11 in the first pixel driving circuit 101 tends to be the same as the potential of the first node N11 in the second pixel driving circuit 102, which is beneficial to improve the brightness uniformity of light-emitting elements 200 driven by the first pixel driving circuit 101 and the second pixel driving circuit 102.

In some embodiments of the disclosure, as shown in FIG. 3, the work cycle of each of the first pixel driving circuit 101 and the second pixel driving circuit 102 includes a second reset phase TR2. In the second reset phase TR2, as shown in FIG. 2, the threshold compensation transistors M12 and the first node reset transistors M13 of the first pixel driving circuit 101 and the second pixel driving circuit 102 are turned on, and the first reset terminal Ref1 may reset the third node N13 through the threshold compensation transistor M12 and the first node reset transistor M13, to adjust bias states of the driving transistors M0 of the first pixel driving circuit 101 and the second pixel driving circuit 102.

In some embodiments of the disclosure, as shown in FIG. 1, the second scanning control terminal S22 in the pixel driving circuit 100 may be electrically connected to the first scanning driving unit 210 at the previous stage. That is, in addition to being electrically connected to the first scanning control terminals S21 of the multiple pixel driving circuits 100 in the pixel group 1 corresponding to the first scanning driving unit 210, the first scanning driving unit 210 may also be electrically connected to the second scan control terminals S22 of the multiple pixel driving circuits 100 in the next pixel group 1.

Figure 4:
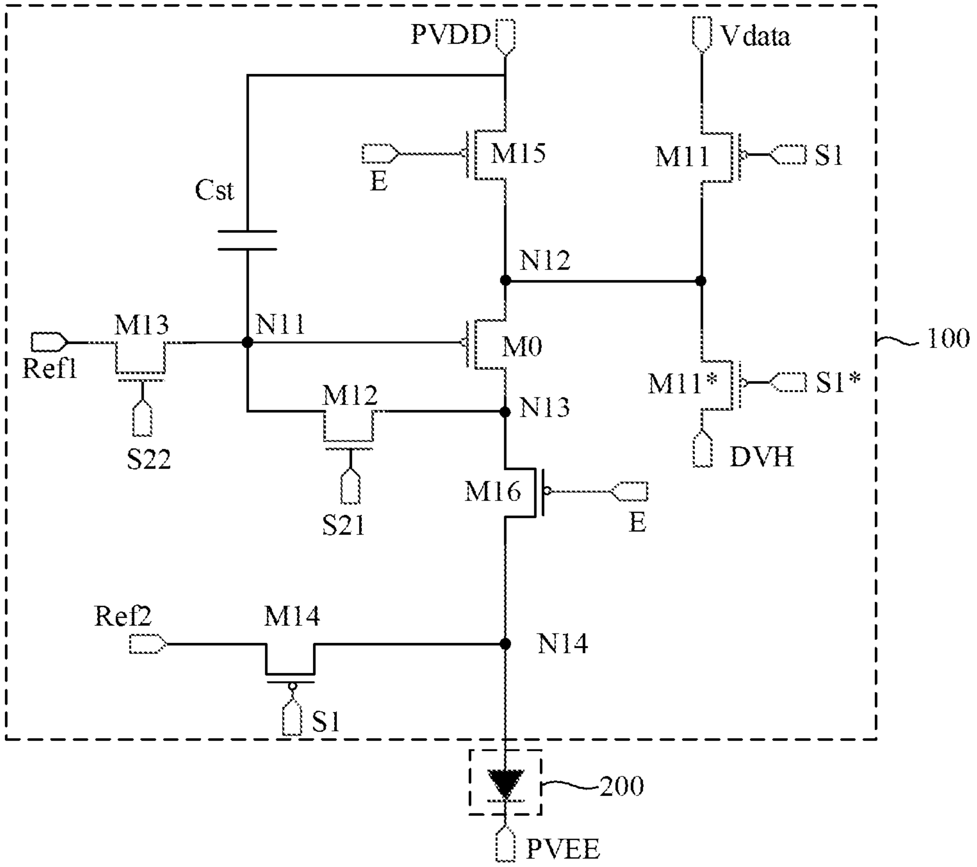
FIG. 4 is a schematic diagram of another pixel driving circuit according to an embodiment of the present disclosure.
Figure 5:
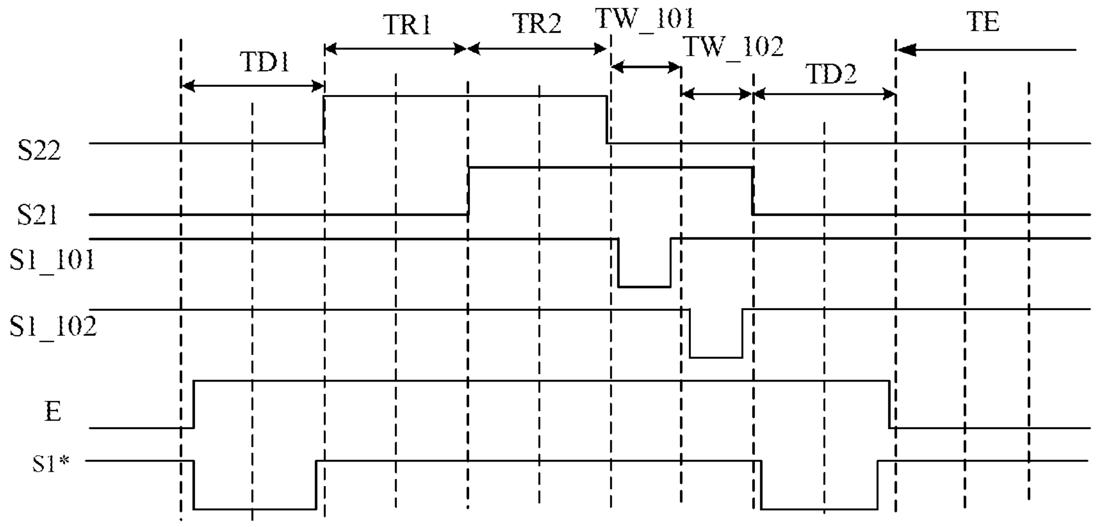
FIG. 5 is a working timing sequence corresponding to FIG. 4.

FIG. 4 is a schematic diagram of another pixel driving circuit according to an embodiment of the present disclosure, and FIG. 5 is a working timing sequence corresponding to FIG. 4. In some embodiments of the disclosure, as shown in FIG. 4 and FIG. 5, the pixel driving circuit 100 includes an adjustment transistor M11*, a control electrode of the adjustment transistor M11* is electrically connected to an adjustment control terminal S1*, a first electrode of the adjustment transistor M11* is electrically connected to an adjustment terminal DVH, and a second electrode of the adjustment transistor M11* is electrically connected to the second node N12. Other structures except the adjustment transistor M11* in FIG. 5 may be set according to corresponding structures in the pixel driving circuit 100 shown in FIG. 2, and details are not described herein again.

As shown in FIG. 5, a working cycle of the pixel driving circuit 100 can include a first bias adjustment phase TD1 and a second bias adjustment phase TD2. The first bias adjustment phase TD1 is prior to the first reset phase TR1, and the second offset bias adjustment phase TD2 is after the data writing phase of the corresponding pixel driving circuit 100. In the first bias adjustment phase TD1 and the second bias adjustment phase TD2, the pixel driving circuit 100 is in a non-emitting state. In the first bias adjustment phase TD1 and the second bias adjustment phase TD2, the adjustment terminal DVH writes a bias adjustment signal to the second node N12 through the adjustment transistor M11*, so as to adjust the bias state of the drive transistor M0 in this phase.

In some embodiments of the disclosure, in the display duration of the one frame of the image, a turned-on duration of the data writing transistor M11 in the first pixel driving circuit 101 is shorter than a turned-on duration of the data writing transistor M11 in the second pixel driving circuit 102. In this way, a threshold compensation phase of the first pixel driving circuit 101 may be shorter than a threshold compensation phase of the second pixel driving circuit 102, so that the threshold compensation for the first pixel driving circuit 101 is incomplete. In a pixel driving circuit, after the threshold compensation is performed, the potential of the first node N11 satisfies: $V_{N11}=V_{data}-|V_{th}|$. $V_{th}$ is a threshold voltage of the driving transistor written to the first node N11 of the pixel driving circuit when the data writing transistor M11 of the corresponding pixel driving circuit is turned off. Therefore, in the embodiments of the present disclosure, after each data writing transistor M11 is turned off, the potential of the first node N11 in the first pixel driving circuit 101 is higher than the potential of the first node N11 in the second pixel driving circuit 102, thereby compensating a difference between a leakage duration of the first node N11 in the first pixel driving circuit 101 and a current leaking duration of the first node N11 in the second pixel driving circuit 102.

Figure 6:
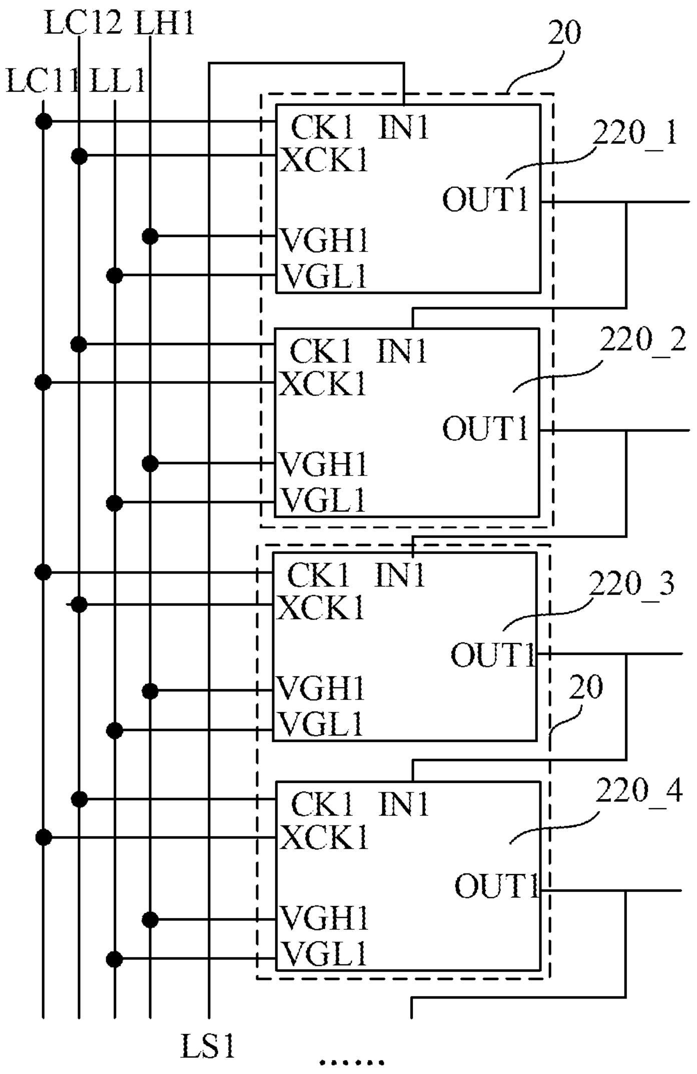
FIG. 6 is a schematic diagram of a second scanning driving circuit according to an embodiment of the present disclosure.
Figure 7:
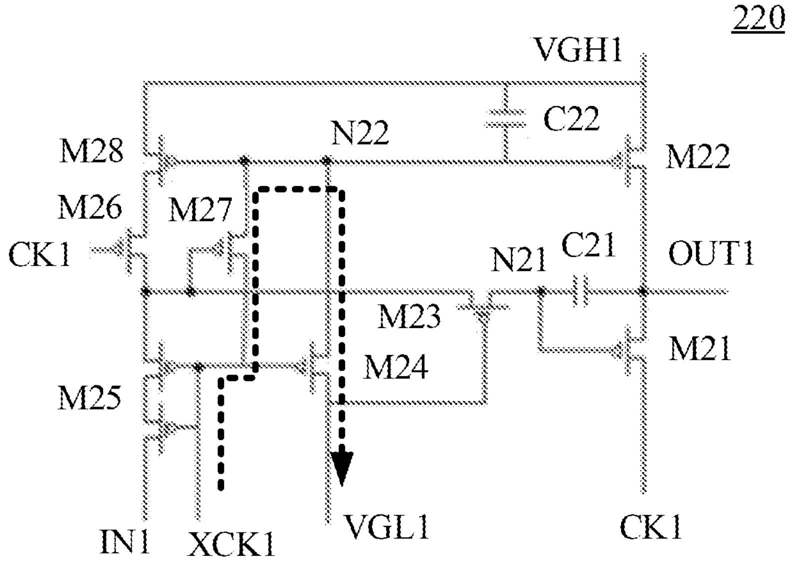
FIG. 7 is a schematic circuit diagram of a second scanning driving unit according to an embodiment of the present disclosure.
Figure 8:
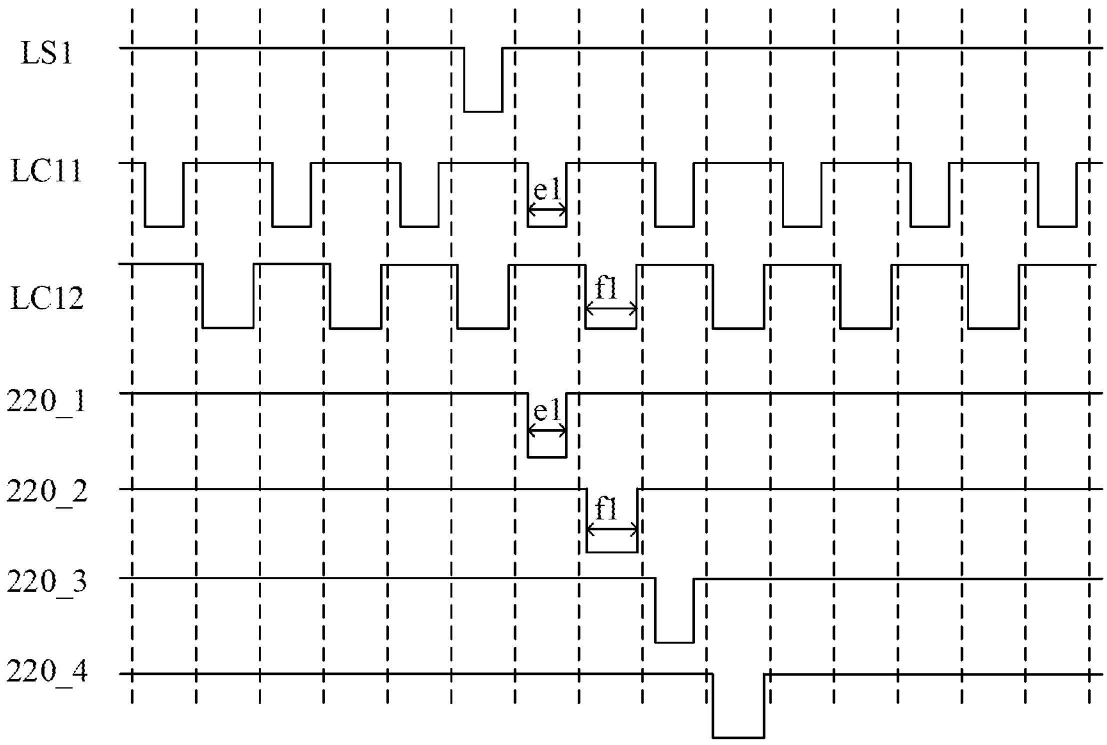
FIG. 8 is a working timing sequence corresponding to FIG. 6.

FIG. 6 is a schematic diagram of a second scanning driving circuit according to an embodiment of the present disclosure, FIG. 7 is a schematic circuit diagram of a second scanning driving unit according to an embodiment of the present disclosure, and FIG. 8 is a working timing sequence corresponding to FIG. 6. In some embodiments, as shown in FIG. 6, FIG. 7, and FIG. 8, the second scanning driving unit 220 includes a first output transistor M21, a second output transistor M22, a third transistor M23, a fourth transistor M24, a fifth transistor M25, and a sixth transistor M26, a seventh transistor M27, an eighth transistor M28, a first capacitor C21, and a second capacitor C22. A first electrode of the first output transistor M21 is electrically connected to a first clock terminal CK1, a second electrode of the first output transistor M21 is electrically connected to an output terminal OUT1 of the second scanning driving unit 220, and a control electrode of the first output transistor M21 is electrically connected to a first node N21. A first electrode of the second output transistor M22 is electrically connected to a second level terminal VGH1, a second electrode of the second output transistor M22 is electrically connected to the output terminal OUT1 of the second scanning driving unit 220, and a control electrode of the second output transistor M22 is electrically connected to a second node N22. Control electrodes of the fifth transistor M25 and the fourth transistor M24 are both electrically connected to a second clock terminal XCK1, a first electrode of the fifth transistor M25 is electrically connected to an input terminal IN1, and a second electrode of the fifth transistor M25 is electrically connected to a control electrode of the seventh transistor M27. A first electrode of the sixth transistor M26 is electrically connected to a first electrode of the third transistor M23, a first electrode of the seventh transistor M27 is electrically connected to the second clock terminal XCK1, and a second electrode of the seventh transistor M27 is electrically connected to a control electrode of the eighth transistor M28. A control electrode of the sixth transistor M26 is electrically connected to the first clock terminal CK1, a second electrode of the sixth transistor M26 is electrically connected to a first electrode of the eighth transistor M28, and a second electrode of the eighth transistor M28 is electrically connected to the second level terminal VGH1. A first electrode of the fourth transistor M24 is electrically connected to a first level terminal VGL1, and a second electrode of the fourth transistor M24 is electrically connected to the control electrode of the second output transistor M22. A control electrode of the third transistor M23 is electrically connected to the first level terminal VGL1, and a second electrode of the third transistor M23 is electrically connected to the control electrode of the first output transistor M21. The output terminals OUT1 of the second scanning driving units in all levels in the second scanning driving circuit are electrically connected to the control electrodes of the data writing transistors M11 of the corresponding pixel driving circuits 100 described above.

When the first output transistor M21 of the second scanning driving unit 220 is turned on, a signal of the first clock terminal CK1 is outputted to the output terminal OUT1. The signal received by the first clock terminal CK1 is a pulse signal including an effective level capable of turning on the data writing transistor M11 in the pixel driving circuit 100. For example, when the data writing transistor M11 is a P-type transistor, the effective level is a low-level signal VGL. When the data writing transistor M1 is an N-type transistor, the effective level is a high-level signal VGH.

In some embodiments of the present disclosure, the display panel includes B types of clock signal lines, and the B types of clock signal lines are electrically connected to the first clock terminals CK1 of the B stages of second scanning driving units 220 in a same second scanning driving unit group 20, respectively. Each type of clock signal line is configured to transmit a periodic pulse signal. The pulse signal includes an effective level that controls the data writing transistor M11 of the pixel driving circuit 100 to be turned on. In some embodiments of the present disclosure, the effective levels of any two types of clock signal lines in the B types of clock signal lines are different from each other. For example, pulse widths of the effective levels transmitted by the B types of clock signal lines are different from each other. The pulse widths of the effective level outputted by the B types of clock signal lines gradually increase in an order in which the effective levels are outputted by the B types of clock signal lines.

For example, the B cascaded second scanning driving units 220 in a same second scanning driving unit group 20 at least include an m-th stage second scanning driving unit 220_*m* and an n-th stage second scanning driving unit 220_*n*. An output terminal of the m-th stage second scanning driving unit 220_*m* is electrically connected to the data writing control terminal S1 of the first pixel driving circuit 101, and an output terminal of the n-th stage second scanning driving unit 220_*n* is electrically connected to the data writing control terminal S1 of the second pixel driving circuit 102. Correspondingly, the B types of clock signal lines included in the display panel at least include an m-th type clock signal line and an n-th type clock signal line. The m-th type clock signal line is electrically connected to the first clock terminal CK1 of the m-th stage second scanning driving unit 220_*m*, and the n-th type clock signal line is electrically connected to the first clock terminal CK1 of the n-th stage second scanning driving unit 220_*n*. The m-th stage second scanning driving unit 220_*m* outputs the effective level first, and then the n-th stage second scanning driving unit 220_*n* outputs the effective level, so that the first pixel driving circuit 101 firstly performs data writing and then the second pixel driving circuit 102 performs data writing in the display duration of the one frame of the image. In some embodiments of the present disclosure, a pulse width of an effective level transmitted by the m-th type clock signal line is smaller than a pulse width of an effective level transmitted by the n-th type clock signal line, where m and n are both integers, and $1 \le m < n \le B$. For example, m=1, n=2 in a case where B=2. m=1, n=2; or m=1, n=3; or m=2, n=3; in a case where B=3.

Taking B=2 as an example, as shown in FIG. 6, two cascaded second scanning driving unit groups 20 are used as an illustration. The two cascaded second scanning driving unit groups 20 correspond to the first second scanning driving unit group 20 and the second scanning driving unit group 20 of the display panel respectively. The input terminal IN1 of the first stage second scanning driving unit 220_1 in the first second scanning driving unit group 20 is electrically connected to a scanning frame start signal line LS1. The output terminal OUT1 of the second stage second scanning driving unit 220_2 in the first second scanning driving unit group 20 is electrically connected to the input terminal IN1 of the first stage second scanning driving unit (corresponding to the third stage second scanning driving unit 220_3 in the display panel) in the second scanning driving unit group 20).

Taking the second scanning driving units in two stages in the first scanning driving unit group 20 as an example, the first clock terminal CK1 of the first stage second scanning driving unit 220_1 is electrically connected to the first type clock signal line LC11, the first clock terminal CK1 of the second stage second scanning driving unit 220_2 is electrically connected to the second type clock signal line LC12. As shown in FIG. 8, a pulse width e1 of the effective level transmitted by the first type clock signal line LC11 is smaller than a pulse width f1 of the effective level transmitted by the second type clock signal line LC12.

In some embodiments of the present disclosure, different second scanning driving units 220 in a same second scanning driving unit group 20 are respectively connected to different types of clock signal lines, and the pulse widths of the effective levels transmitted by different types of clock signal lines gradually increase in an order in which the effective levels are outputted by the different types of clock signal lines, so that the turned-on durations of the data writing transistors M11 in different pixel rows 10 in a same pixel group 1 are different, thereby compensating a difference between leakage durations of the first nodes N11 in different pixel driving circuits in a same pixel group 1.

In some embodiments, the difference in the pulse widths of the effective levels transmitted by all clock signal lines may be adjusted according to current leakage states of the first nodes N11 of different pixel driving circuits in a same pixel group, which is not limited in the embodiments of the present disclosure.

In some embodiments of the present disclosure, the first type clock signal line of the above-mentioned B types of clock signal lines, in addition to being electrically connected to the first clock terminal CK1 of the first stage second scanning driving unit 220 in the second scanning driving unit group 20, may also be electrically connected to the second clock terminal XCK1 of the B-th stage second scanning driving unit 220 in the same second scanning driving unit group 20 as the above first stage second scanning driving unit 220. The i-th type clock signal line of the above-mentioned B types of clock signal lines (i is an integer, and $2 \le i \le B$), in addition to being electrically connected to the first clock terminal CK1 of the i-th stage second scanning driving unit 220 in the second scanning driving unit group 20, may also be electrically connected to the second clock terminal XCK1 of the (i−1)-th stage second scanning driving unit 220 in the same second scanning driving unit group 20 as the above i-th stage second scanning driving unit 220. In this way, it is beneficial to reduce the number of required signal lines while ensuring a normal operation of the second scanning driving circuit 22.

Taking B=2 as an example, as shown in FIG. 6, the first type clock signal line LC11, in addition to being electrically connected to the first clock terminal CK1 of the first stage second scanning driving unit 220_1, may also be electrically connected to the second clock terminal XCK1 of the second stage second scanning driving unit 220_2 in the same second scanning driving unit group 20 as the above first stage second scanning driving unit 220_1. The second type clock signal line LC12, in addition to being electrically connected to the first clock terminal CK1 of the second stage second scanning driving unit 220_2, may also be electrically connected to the second clock terminal XCK1 of the first stage second scanning driving unit 220_1 in the same second scanning driving unit group 20 as the above second stage second scanning driving unit 220_2.

Figure 9:
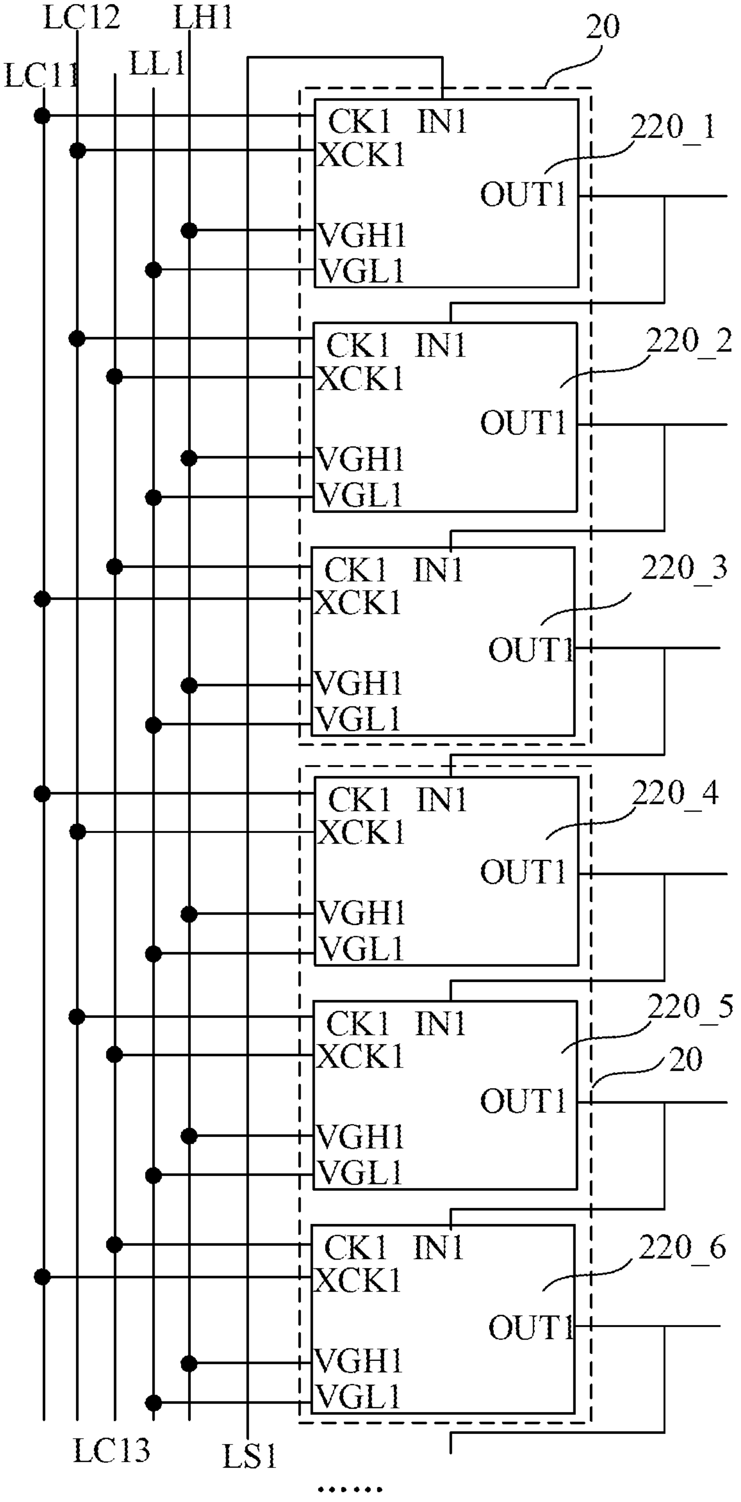
FIG. 9 is a schematic connection diagram of another second scanning driving circuit according to an embodiment of the present disclosure.
Figure 10:
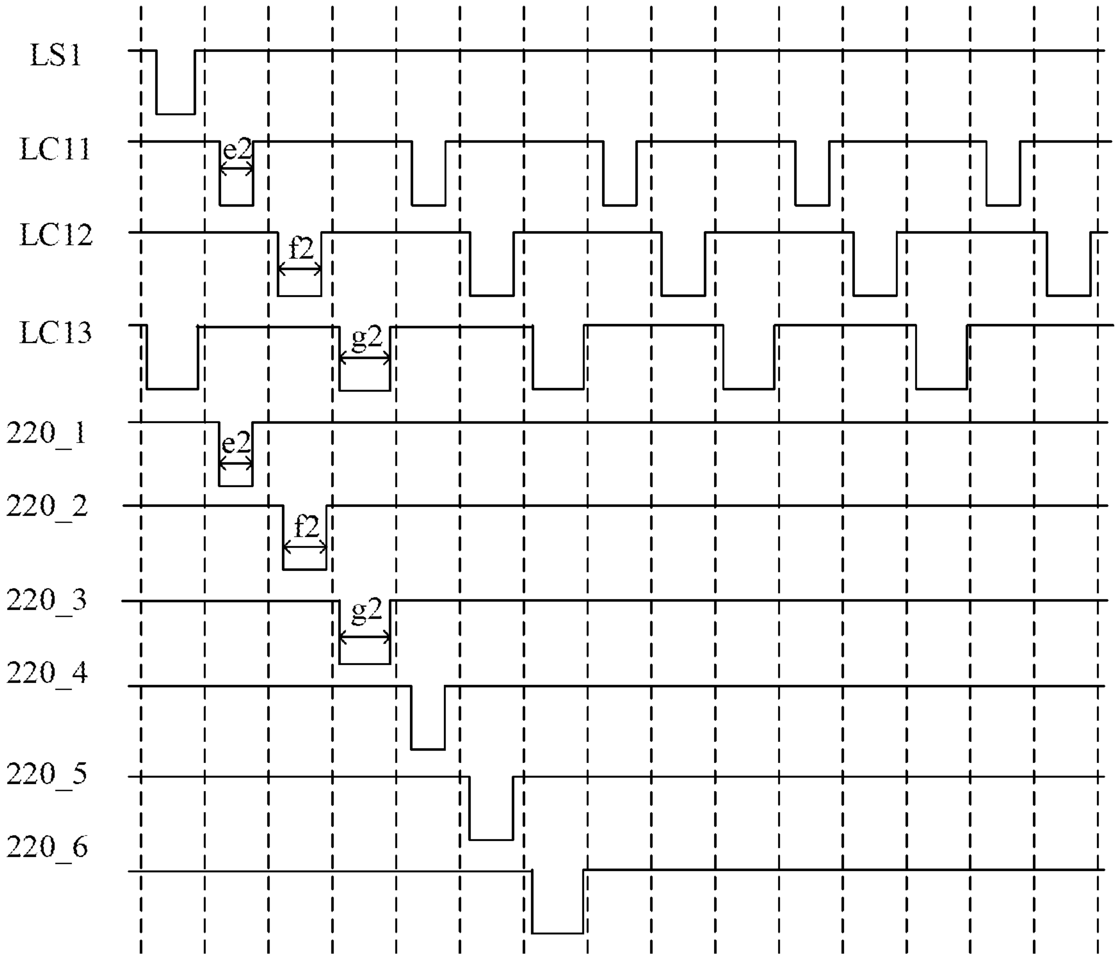
FIG. 10 is a working timing sequence corresponding to FIG. 9.

Taking B=3 as an example, as shown in FIG. 9 and FIG. 10, FIG. 9 is a schematic connection diagram of another second scanning driving circuit according to an embodiment of the present disclosure, and FIG. 10 is a working timing sequence corresponding to FIG. 9. The two second scanning driving unit groups 20 are shown for illustration. Correspondingly, the display panel includes three types of clock signal lines, which are marked as LC11, LC12 and LC13 in FIG. 9 and FIG. 10. A pulse width e2 of the effective level transmitted by the first type clock signal line LC11 is smaller than a pulse width f2 of the effective levels transmitted by the second type clock signal line LC12. The pulse width f2 of the effective level transmitted by the second type clock signal line LC12 is smaller than a pulse width f3 of the effective levels transmitted by the third type clock signal line LC13. For the first second scanning driving unit group 20, the first type clock signal line LC11, in addition to being electrically connected to the first clock terminal CK1 of the first stage second scanning driving unit 220_1, is also electrically connected to the second clock terminal XCK1 of the third stage second scanning driving unit 220_3; the second type clock signal line LC12, in addition to being electrically connected to the first clock terminal CK1 of the second stage second scanning driving unit 220_2, is also electrically connected to the second clock terminal XCK1 of the first stage second scanning driving unit 220_1; the third type clock signal line LC13, in addition to being electrically connected to the first clock terminal CK1 of the third stage second scanning driving unit 220_3, is also electrically connected to the second clock terminal XCK1 of the second stage second scanning driving unit 220_2.

In some embodiments of the present disclosure, the first clock terminals CK1 of the second scanning driving units 220 in a same stage in different second scanning driving unit groups 20 are connected to the same clock signal line. Taking FIG. 6 as an example, the first type clock signal line LC11, in addition to being electrically connected to the first clock terminal CK1 of the first stage second scanning driving unit 220_1 in the first second scanning driving unit group 20, is also electrically connected to the first clock terminal CK1 of the first stage second scanning driving unit 220_1 (i.e., the fourth stage second scanning driving units 220_4 of the display panel) in the second scanning driving unit group 20.

In some embodiments of the present disclosure, the display panel may include B types of first clock signal lines and B types of second clock signal lines. The B types of first clock signal lines are respectively electrically connected to the first clock terminals CK1 of all stages of the second scanning driving units 220 in a same second scanning driving unit group 20. The B types of second clock signal lines are respectively electrically connected to the second clock terminals XCK1 of all stages of second scanning driving units 220 in in a same second scanning driving unit group 20. The pulse widths of the effective levels transmitted by the B types of first clock signal lines gradually decrease in an order in which the effective levels are outputted by the B types of first clock signal lines. Correspondingly, the pulse widths of the effective levels transmitted by the B types of second clock signal lines gradually decrease in an order in which the effective levels are outputted by the B types of second clock signal lines.

In some embodiments of the present disclosure, a frequency of a signal transmitted by the second clock signal line is the same as a frequency of a signal transmitted by the first clock signal line. For example, the frequency of the signal transmitted by the first clock signal line and the frequency of the signal transmitted by the second clock signal line may be smaller than the frequency of the signal transmitted by the clock signal line shown in FIG. 8 and FIG. 10.

Figure 11:
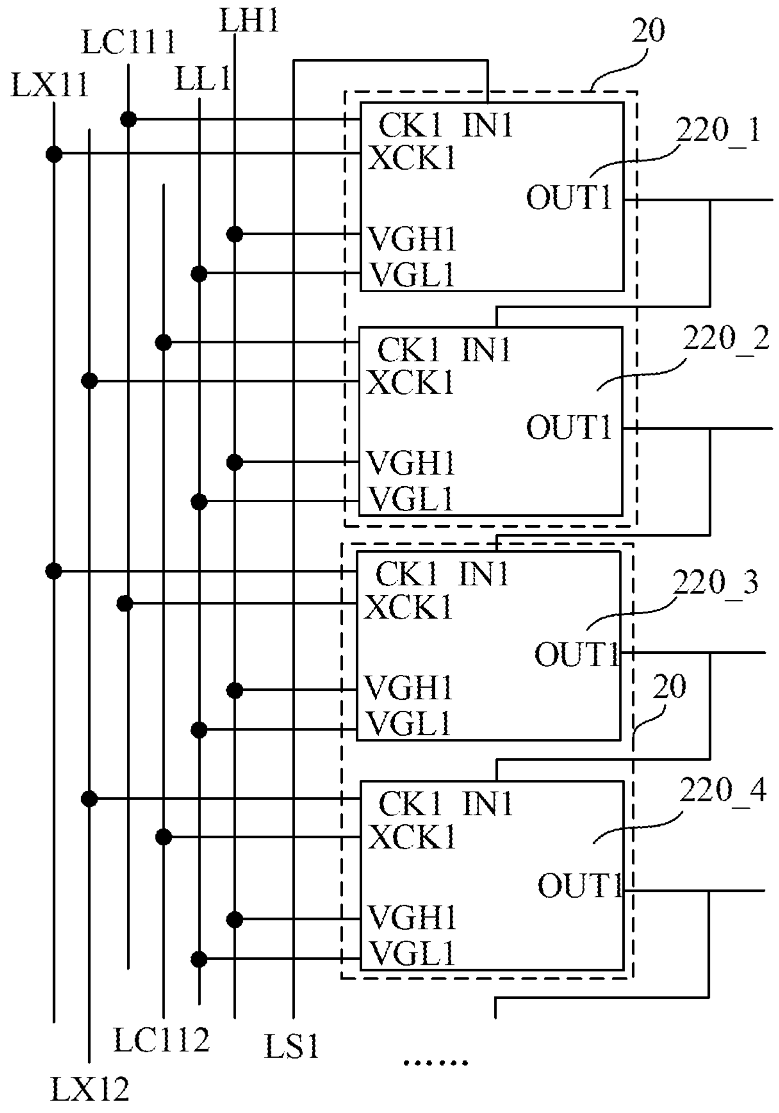
FIG. 11 is a schematic connection diagram of still another second scanning driving circuit according to an embodiment of the present disclosure.
Figure 12:
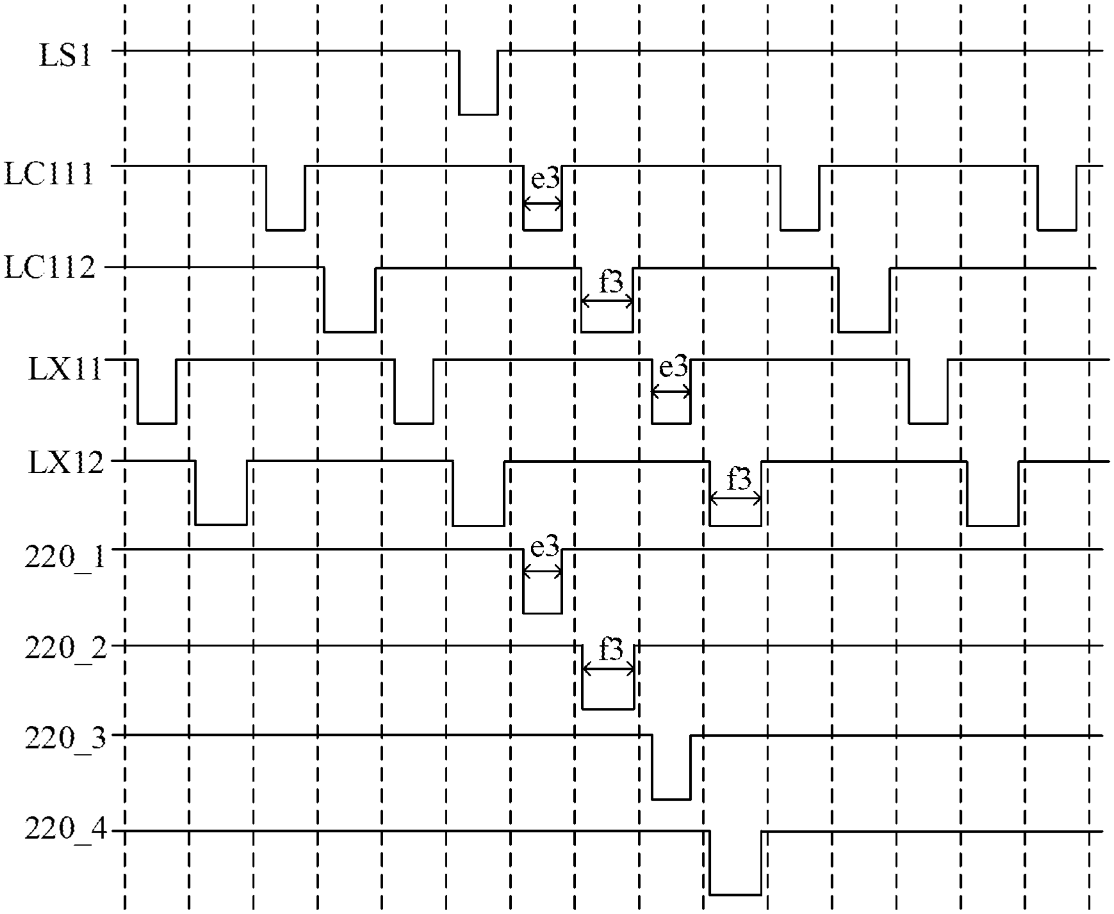
FIG. 12 is a working timing sequence corresponding to FIG. 11.

Taking B=2 as an example, exemplarily, as shown in FIG. 11 and FIG. 12, FIG. 11 is a schematic connection diagram of still another second scanning driving circuit according to an embodiment of the present disclosure, and FIG. 12 is a working timing sequence corresponding to FIG. 11. Two cascaded second scanning driving unit groups 20 of the display panel are illustrated in FIG. 11. As shown in FIG. 11, the display panel includes a first type first clock signal line LC111, a second type first clock signal line LC112, a first type second clock signal line LX11 and a second type second clock signal line LX12. The first type first clock signal line LC111 is electrically connected to the first clock terminal CK1 of the first stage second scanning driving unit 220_1, and the second type first clock signal line LC112 is electrically connected to the first clock terminal CK1 of the second stage second scanning driving unit 220_2. The first type second clock signal line LX11 is electrically connected to the second clock terminal XCK1 of the first stage second scanning driving unit 220_1, and the second type second clock signal line LX12 is electrically connected to the second clock terminal XCK1 of the second stage second scanning driving unit 220_2. A pulse width e3 of an effective level transmitted by the first type first clock signal line LC111 is smaller than a pulse width f3 of an effective level transmitted by the second type first clock signal line LC112. Both the pulse width of the effective level transmitted by the first type first clock signal line LC111 and a pulse width of an effective level transmitted by the first type second clock signal line LX11 are e3. Both the pulse width of the effective level transmitted by the second type first clock signal line LC112 and a pulse width of an effective level transmitted by the second type second clock signal line LX12 are f3. The effective level transmitted by the second type first clock signal line LC112 is between the effective level transmitted by the first type first clock signal line LC111 and the effective level transmitted by the first type second clock signal line LX11. The effective level transmitted by the first type second clock signal line LX11 is between the effective level transmitted by the second type first clock signal line LC112 and the effective level transmitted by the second type second clock signal line LX12. The effective level transmitted by the second type second clock signal line LX12 is between the effective level transmitted by the first type first clock signal line LC111 and the effective level transmitted by the first type second clock signal line LX11. In this way, while ensuring a normal operation of the second scanning driving circuit 220, the frequencies of the signals transmitted by all types of first clock signal lines and all types of second clock signal lines can be small, which is beneficial to reduce a power consumption of the display panel.

In some embodiments of the present disclosure, each type of first clock signal line is connected to the first clock terminal CK1 of one stage second scanning driving unit 220 in one second scanning driving unit group 20 and is also connected to the second clock terminal XCK1 of one stage second scanning driving unit 220 in another second scanning driving unit group 20 adjacent to the one second scanning driving unit group 20. As shown in FIG. 11, the first clock signal line LC111 of the first type is electrically connected to the first clock terminal CK1 of a first stage second scanning driving unit 220_1 in a first one of the second scanning driving unit groups 20, and is also electrically connected to the second clock terminal XCK1 of a first stage second scanning driving unit 220 (that is, the third stage second scanning driving unit 220_3 of the display panel) in a second one of the second scanning driving unit groups 20.

Similarly, each type of second clock signal line is connected to the second clock terminal XCK1 of one stage second scanning driving unit 220 in one second scanning driving unit group 20 and is also connected to the first clock terminal CK1 of one stage second scanning driving unit 220 in another second scanning driving unit group 20 adjacent to the one second scanning driving unit group 20. As shown in FIG. 11, the first type second clock signal line LX11 is electrically connected to the second clock terminal XCK1 of the first stage second scanning driving unit 220_1 in a first one of the second scanning driving unit groups 20, and is also electrically connected to the first clock terminal CK1 of the first stage second scanning driving unit 220 (that is, the third stage second scanning driving unit 220_3 of the display panel) in a second one of the second scanning driving unit groups 20.

With reference to FIG. 7, a width to length ratio of a channel of the first output transistor M21 of the second scanning driving unit 220 that is electrically connected to the first pixel driving circuit 101 is W11/L11, and a width to length ratio of a channel of the first output transistor M21 of the second scanning driving unit 220 that is electrically connected to the second pixel driving circuit 102 is W21/L21. In some embodiments of the disclosure, W11/L11<W21/L21. In this way, an output delay degree of the second scanning driving unit 220 electrically connected to the first pixel driving circuit 101 is greater than an output delay degree of the second scanning driving unit 220 electrically connected to the second pixel driving circuit 102, so that a period of the effective level received by the data writing control terminal S1 of the first pixel driving circuit 101 is shorter than a period of the effective level received by the data writing control terminal S1 of the second pixel driving circuit 102, thereby compensating a difference between a current leakage duration of the first node N11 in the first pixel driving circuit 101 and a current leakage duration of the first node N11 in the second pixel driving circuit 102.

In some embodiments of the present disclosure, an on-state current of the data writing transistor M11 in the first pixel driving circuit 101 is smaller than an on-state current of the data writing transistor M11 in the second pixel driving circuit 102, so that a threshold compensation level of the pixel driving circuit 101 is smaller than a threshold compensation level of the second pixel driving circuit 102, thereby making the potential of the first node N11 of the first pixel driving circuit 101 is higher than the potential of the first node N11 of the second pixel driving circuit 102 after corresponding data writing transistors M11 are turned off.

In some embodiments of the present disclosure, the data writing transistor M11 includes a P-type transistor or an N-type transistor.

In a case where both the data writing transistors M11 of the first pixel driving circuit 101 and the second pixel driving circuit 102 include P-type transistors, the P-type transistors are turned on at a low level. In some embodiments of the present disclosure, the effective level outputted by the second scanning driving unit 220 electrically connected to the first pixel driving circuit 101 is greater than the effective level outputted by the second scanning driving unit 220 electrically connected to the second pixel driving circuit 102, so that the on-state current of the data writing transistor M11 in the first pixel driving circuit 101 is smaller than the on-state current of the data writing transistor M11 in the second pixel driving circuit 102.

In a case where both the data writing transistors M11 of the first pixel driving circuit 101 and the second pixel driving circuit 102 include N-type transistors, the N-type transistors are turned on at a high level. In some embodiments of the present disclosure, the effective level outputted by the second scanning driving unit 220 electrically connected to the first pixel driving circuit 101 is smaller than the effective level outputted by the second scanning driving unit 220 electrically connected to the second pixel driving circuit 102, so that the on-state current of the data writing transistor M11 in the first pixel driving circuit 101 is smaller than the on-state current of the data writing transistor M11 in the second pixel driving circuit 102.

Figure 13:
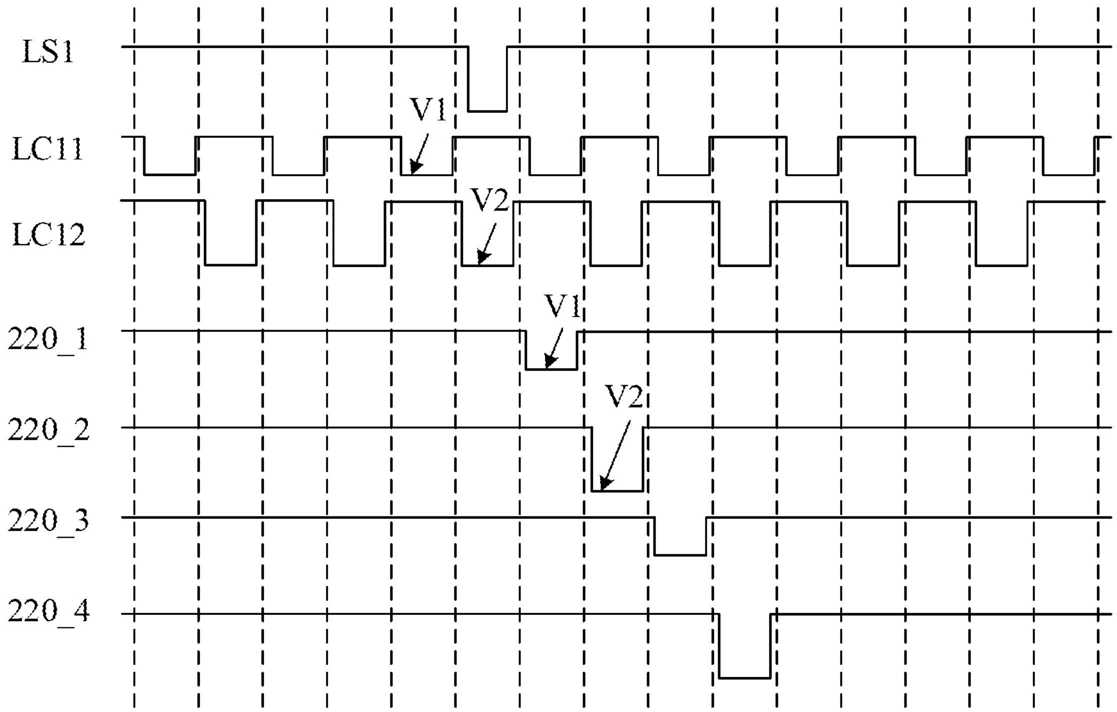
FIG. 13 is another working timing sequence corresponding to FIG. 6.

In some embodiments of the present disclosure, in a case where both the data writing transistors M11 of the first pixel driving circuit 101 and the second pixel driving circuit 102 include P-type transistors, an effective level Vm transmitted by the m-th type clock signal line electrically connected to the first clock terminal CK1 of the m-th stage second scanning driving unit 220_*m* is greater than an effective level Vn transmitted by the n-th type clock signal line electrically connected to the first clock terminal CK1 of the n-th stage second scanning driving unit 220_*n*. As mentioned above, the effective level output by the second scanning driving unit 220 is the effective level of the signal received by the first clock terminal CK1. By setting Vm>Vn in the embodiments of the present disclosure, the on-state current of the data writing transistor M11 in the first pixel driving circuit 101 is smaller than the on-state current of the data writing transistor M11 in the second pixel driving circuit 102. Taking B=2 as an example, referring to FIG. 6 and FIG. 13, FIG. 13 is another working timing sequence corresponding to FIG. 6. An effective level V1 transmitted by the first type clock signal line LC11 is greater than an effective level V2 transmitted by the second type clock signal line LC12.

While magnitudes of the effective levels transmitted by all clock signal lines are different from each other, the pulse widths of the effective levels transmitted by all clock signal lines may also be adjusted in the aforementioned manner.

In some embodiments of the present disclosure, in a case where both the data writing transistors M11 of the first pixel driving circuit 101 and the second pixel driving circuit 102 include N-type transistors, an effective level Vm transmitted by the m-th type clock signal line electrically connected to the first clock terminal CK1 of the m-th stage second scanning driving unit 220_*m* is smaller than an effective level Vn transmitted by the n-th type clock signal line electrically connected to the first clock terminal CK1 of the n-th stage second scanning driving unit 220_*n*, so that the on-state current of the data writing transistor M11 in the first pixel driving circuit 101 is smaller than the on-state current of the data writing transistor M11 in the second pixel driving circuit 102.

The display panel can include B types of first level signal lines. The B types of first level signal lines are respectively electrically connected to the first level terminals VGL1 of B stages of second scanning driving units in a same second scanning driving unit group 20.

In a case where the data writing transistors M11 of all pixel driving circuits in a same pixel group 1 are all P-type transistors, magnitudes of the potentials of the signals transmitted by the B types of first level signal lines gradually decrease in an order in which the effective levels of all stages of the second scanning driving units in a same second scanning driving unit group 20 are outputted.

In a case where the data writing transistors M11 of all pixel driving circuits in a same pixel group 1 are all N-type transistors, magnitudes of the potentials of the signals transmitted by the B types of first level signal lines gradually increase in an order in which the effective levels of all stages of the second scanning driving units in a same second scanning driving unit group 20 are outputted.

For example, the B types of first level signal lines at least include an m-th type first level signal line and an n-th type first level signal line, the m-th type first level signal line is electrically connected to the first level terminal VGL1 of the m-th stage second scanning driving unit, and the n-th type first level signal line is electrically connected to the first level terminal VGL1 of the n-th stage second scanning driving unit. In some embodiments of the present disclosure, in a case where the data writing transistors M11 of all pixel driving circuits in a same pixel group 1 are all P-type transistors, a level transmitted by the m-th type first level signal line is greater than a level transmitted by the n-th type first level signal line.

Figure 14:
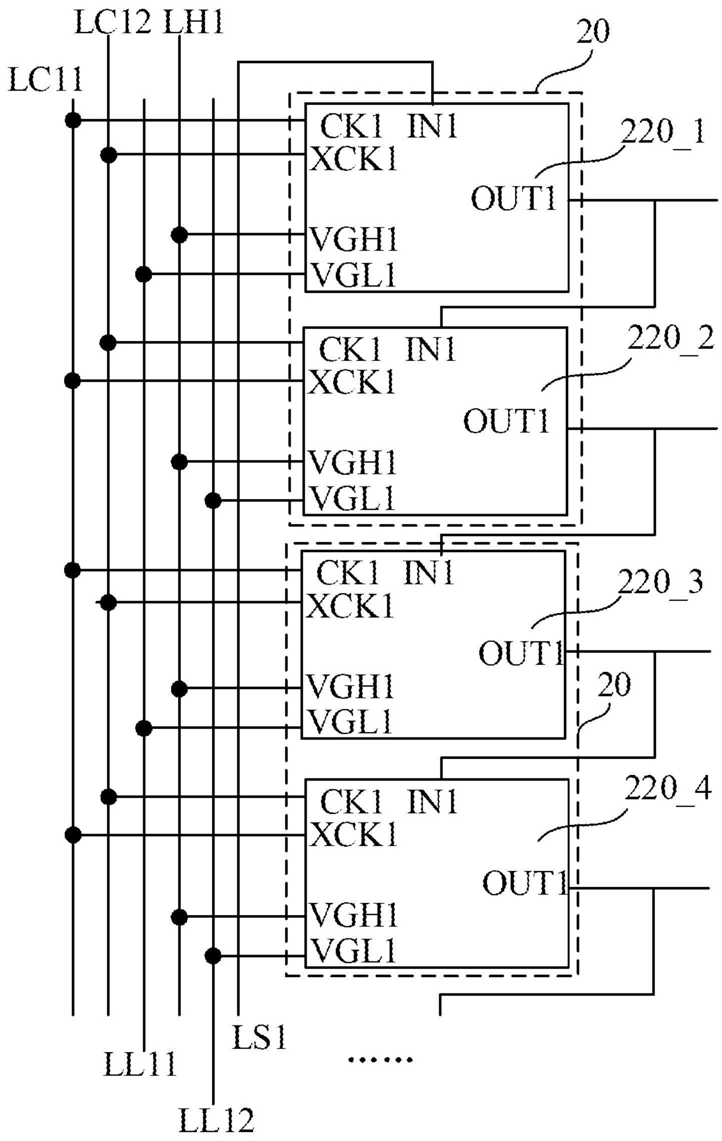
FIG. 14 is a schematic connection diagram of still another second scanning driving circuit according to an embodiment of the present disclosure.

Taking B=2 as an example, as shown in FIG. 14, FIG. 14 is a schematic connection diagram of still another second scanning driving circuit according to an embodiment of the present disclosure, two second scanning driving unit groups 20 in the display panel are used as for illustration. For two second scanning driving units 220 in a same second scanning driving unit group 20, the first level terminal VGL1 of the first stage second scanning driving unit 220_1 is electrically connected to a first type first level signal line LL11; and the first level terminal VGL1 of the second stage second scanning driving unit 220_2 is electrically connected to a second type first level signal line LL12. A level transmitted by the first type first level signal line LL11 is greater than a level transmitted by the second type first level signal line LL12.

For the second scanning driving unit 220, as shown in FIG. 7, when the potential of the second clock terminal XCK1 is low, the fifth transistor M25 and the fourth transistor M24 are turned on. When the signal inputted from the input terminal IN1 is also low, the control electrode of the seventh transistor M27 is written to be low by the input terminal IN through the fifth transistor M25, so that the seventh transistor M27 is turned on, and the low level of the second clock terminal XCK1 is written to the control electrode of the eighth transistor M28. Meanwhile, the control electrode of the eighth transistor M28 is also written to be low by the first level terminal VGL1 through the fourth transistor M24. In some embodiments of the present disclosure, by differentially setting the potentials connected to the first level terminals VGL1 of the second scanning driving units 220 in all levels of a same second scanning driving unit group 20, the potentials connected to the first level terminals VGL1 of the second scanning driving units 220 in all levels can match the potentials connected to the second clock terminals XCK1 of the second scanning driving units 220 respectively, which is beneficial to avoid a short-circuit of a path (as shown by the dotted arrow in FIG. 7) formed by the second clock terminal XCK1, the seventh transistor M27 and the first level terminal VGL1, therefore, a display effect of the display panel can be ensured.

An embodiment of the present disclosure also provides a display panel. As shown in FIG. 1 and FIG. 2, the display panel includes multiple pixel groups 1 and a first scanning driving circuit 21. The pixel group 1 includes B pixel rows 10 B≥2, and B is an integer. The pixel row 10 includes multiple pixel driving circuits 100. The pixel driving circuit 100 includes a driving transistor M0, a data writing control terminal S1 and a first scanning control terminal S21. A control electrode of the driving transistor M0 is electrically connected to a first node N11, and a first electrode of the driving transistor M0 is electrically connected to a second node N12. The first scanning driving circuit 21 includes multiple cascaded first scanning driving units 210, and the first scanning driving unit 210 is electrically connected to the multiple first scanning control terminals S21 in a same pixel group 1.

A working cycle of the pixel driving circuit 100 includes a data writing phase. The data writing control terminal S1 and the first scanning control terminal S21 receives an effective level during the data writing phase. The multiple pixel driving circuits 100 in a same pixel group 1 include a first pixel driving circuit 101 and a second pixel driving circuit 102. As shown in FIG. 3, the data writing phase TW_101 of the first pixel driving circuit 101 is prior to the data writing phase TW_102 of the second pixel driving circuit 102 in the display duration of the one frame of the image. In some embodiments of the disclosure, in a case where the first pixel driving circuit 101 and the second pixel driving circuit 102 receive a same data voltage, a current leaking speed at the first node N11 in the first pixel driving circuit 101 is $v_{N11}$ after the data writing phase TW_101 of the first pixel driving circuit 101, a current leaking speed at the first node N11 in the second pixel driving circuit 102 is $v_{N12}$ after the data writing phase TW_102 of the second pixel driving circuit 102, where $v_{N11}<v_{N12}$.

In the display panel provided by the embodiments of the present disclosure, the first scanning driving unit 210 is electrically connected to multiple the first scanning control terminals S21 in a same pixel group 1, in this way, the number of the first scanning driving units 210 required by the display panel can be reduced, thereby reducing a space occupied by the first scanning driving circuit 21 in the non-display area NA, which is beneficial to improve a screen ratio of the display panel.

In a case where the first pixel driving circuit 101 and the second pixel driving circuit 102 receive a same data voltage, after the data writing phase of the first pixel driving circuit 101 and the data writing phase of the second pixel driving circuit 102, that is, when the data writing transistor M11 of the first pixel driving circuit 101 and the data writing transistor M11 of the second pixel driving circuit 102 are turned off, by setting $v_{N11}<v_{N12}$ in the embodiments of the disclosure, a difference between the current leakage duration of the first node N11 in the first pixel driving circuit 101 and the current leakage duration of the first node N11 in the second pixel driving circuit 102 can be compensated or even eliminated. After entering a light-emitting phase, the potential of the first node N11 in the first pixel driving circuit 101 tends to be the same as the potential of the first node N11 in the second pixel driving circuit 102, which is beneficial to improve the brightness uniformity of light-emitting elements 200 driven by the first pixel driving circuit 101 and the second pixel driving circuit 102.

In some embodiments of the present disclosure, a width to length ratio of a channel of the first light-emitting control transistor M16 in the first pixel driving circuit 101 is W12/L12, and a width to length ratio of a channel of the first light-emitting control transistor M16 in the second pixel driving circuit 102 is W22/L22, where W12/L12<W22/L22. In this way, in to process that the potential of the first node N11 of the first pixel driving circuit 101 leaks current to the fourth node N14 through the threshold compensation transistor M12, the third node N13 and the first light-emitting control transistor M16, the width to length ratio W12/L12 of the channel of the first light-emitting control transistor M16 in the first pixel driving circuit 101 is smaller than the width to length ratio W22/L22 of the channel of the first light-emitting control transistor M16 in the second pixel driving circuit 102, therefore, the current leaking speed $v_{N11}$ at the first node N11 in the first pixel driving circuit 101 is smaller than the current leaking speed $v_{N12}$ at the first node N11 in the first pixel driving circuit 102.

Figure 15:
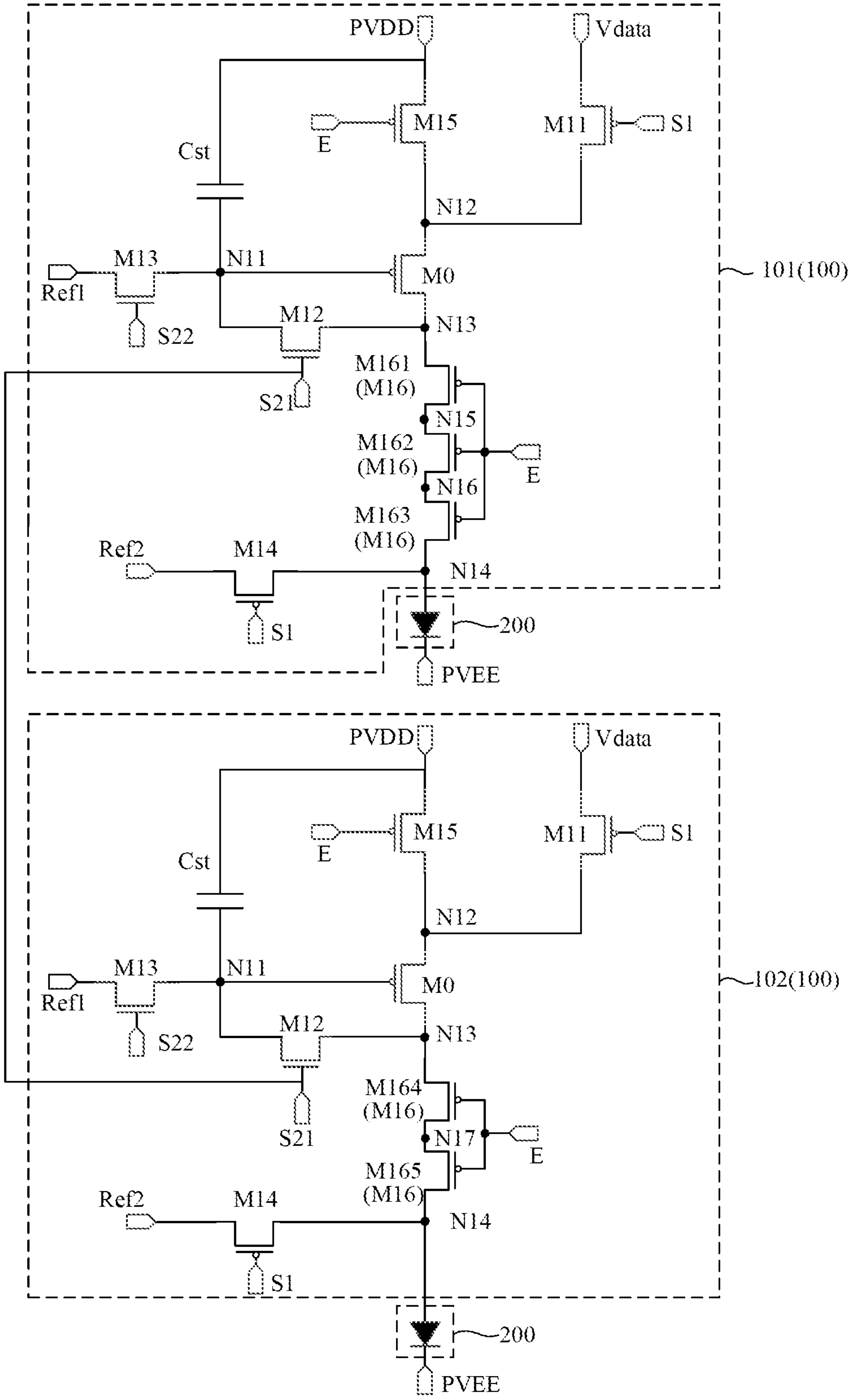
FIG. 15 is a schematic diagram of a connection relationship between a first pixel driving circuit and a second pixel driving circuit according to an embodiment of the present disclosure.

In some embodiments of the present disclosure, the first light-emitting control transistor M16 in each of the first pixel driving circuit 101 and the second pixel driving circuit 102 includes multiple sub-transistors connected in series with each other. As shown in FIG. 15, FIG. 15 is a schematic diagram of a connection relationship between a first pixel driving circuit and a second pixel driving circuit according to an embodiment of the present disclosure. The first light-emitting control transistor M16 in the first pixel driving circuit 101 includes three sub-transistors connected in series with each other, and the three sub-transistors are M161, M162 and M163, the sub-transistor M161 and the sub-transistor M162 are electrically connected to the fifth node N15, and the sub-transistor M162 and the sub-transistor M163 are electrically connected to the sixth node N16. The first light-emitting control transistor M16 in the second pixel driving circuit 102 includes two sub-transistors connected in series with each other, the two sub-transistors are M164 and M165. The sub-transistor M164 and the sub-transistor M165 are electrically connected to the seventh node N17. The arrangement of multiple sub-transistors connected in series can make the current leaking speed at a current leaking from the third node N13 to the fourth node N14 slow down. Taking the first pixel driving circuit 101 as an example, a voltage difference between the third node N13 and the fifth node N15 is smaller than a voltage difference between the third node N13 and the fourth node N14 shown in FIG. 15. Therefore, based on the arrangement of FIG. 15, the current leaking speed at a current leaking between the third node N13 and the fourth node N14 is slow down.

In some embodiments of the present disclosure, the number of sub-transistors included in the first light-emitting control transistor M16 in the first pixel driving circuit 101 is greater than the number of sub-transistors included in the first light-emitting control transistor M16 in the second pixel driving circuit 102, in this way, the current leaking speed at the first node N11 in the first pixel driving circuit 101 is smaller than the current leaking speed at the first node N11 in the second pixel driving circuit 102.

When setting the light-emitting driving circuit, for example, as shown in FIG. 1, one light-emitting driving unit 230 may be electrically connected to the light-emitting control terminals E of the B pixel rows in the above-mentioned one pixel group 1.

Figure 16:
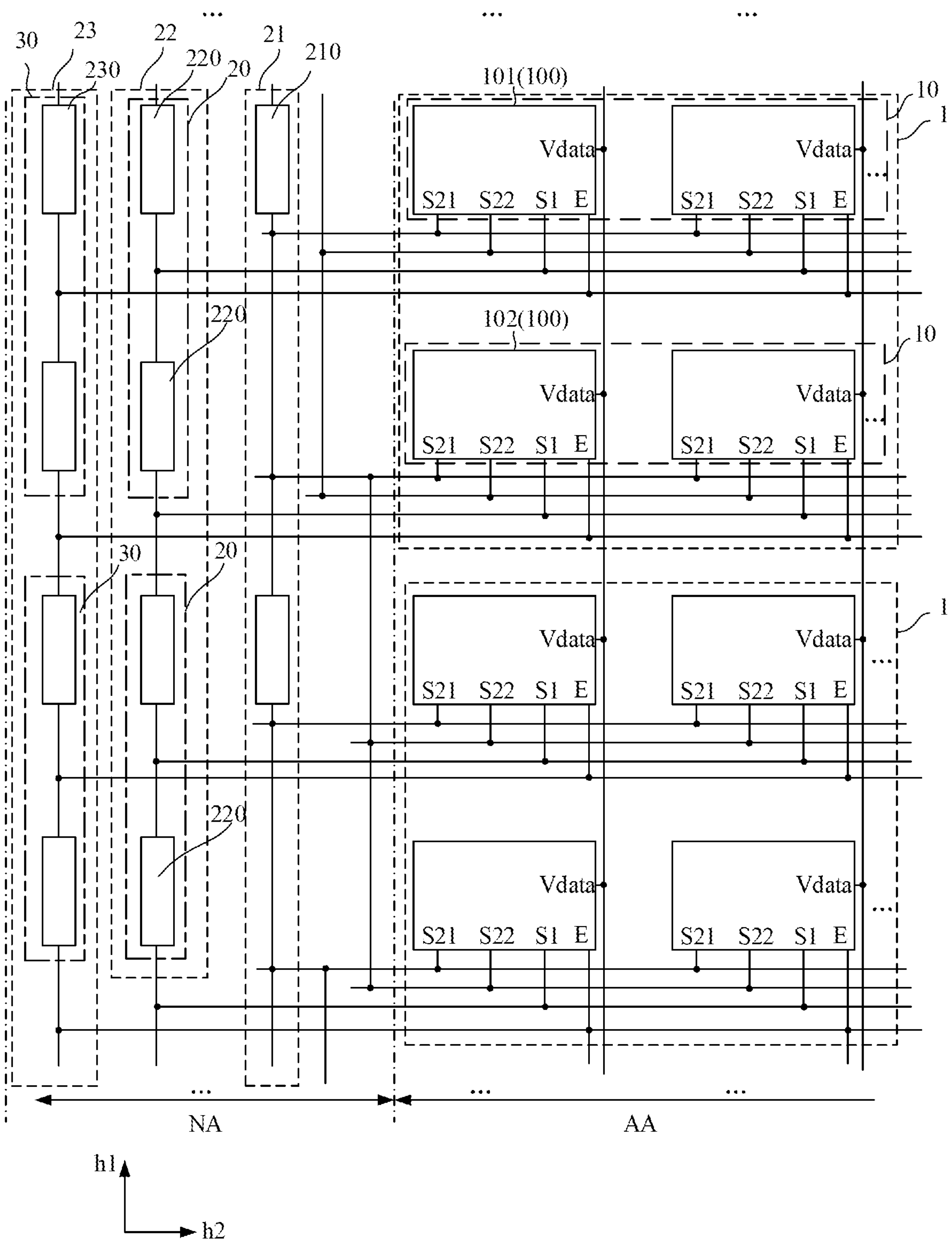
FIG. 16 is a schematic diagram of a partial area of another display panel according to an embodiment of the present disclosure.

In some embodiments of the present disclosure, the light-emitting driving units 230 may be electrically connected to the pixel rows 10 in a one-to-one correspondence. FIG. 16 is a schematic connection diagram of a light-emitting driving circuit according to an embodiment of the present disclosure. The light-emitting driving circuit 23 includes multiple cascaded light-emitting driving unit groups 30, and the light-emitting driving unit group 30 includes B cascaded light-emitting driving units 230. Multiple cascaded light-emitting driving unit groups 30 means that an output terminal of a last level light-emitting driving unit 230 in a previous light-emitting driving unit group 30 is electrically connected to an input terminal of a first level light-emitting driving unit 230 in a current light-emitting driving unit group 30. The multiple cascaded light-emitting driving units 230 in a same light-emitting driving unit group 30 are respectively electrically connected to the light-emitting control terminals E of the pixel driving circuits in different pixel rows 10 in a same pixel group 1.

Figure 17:
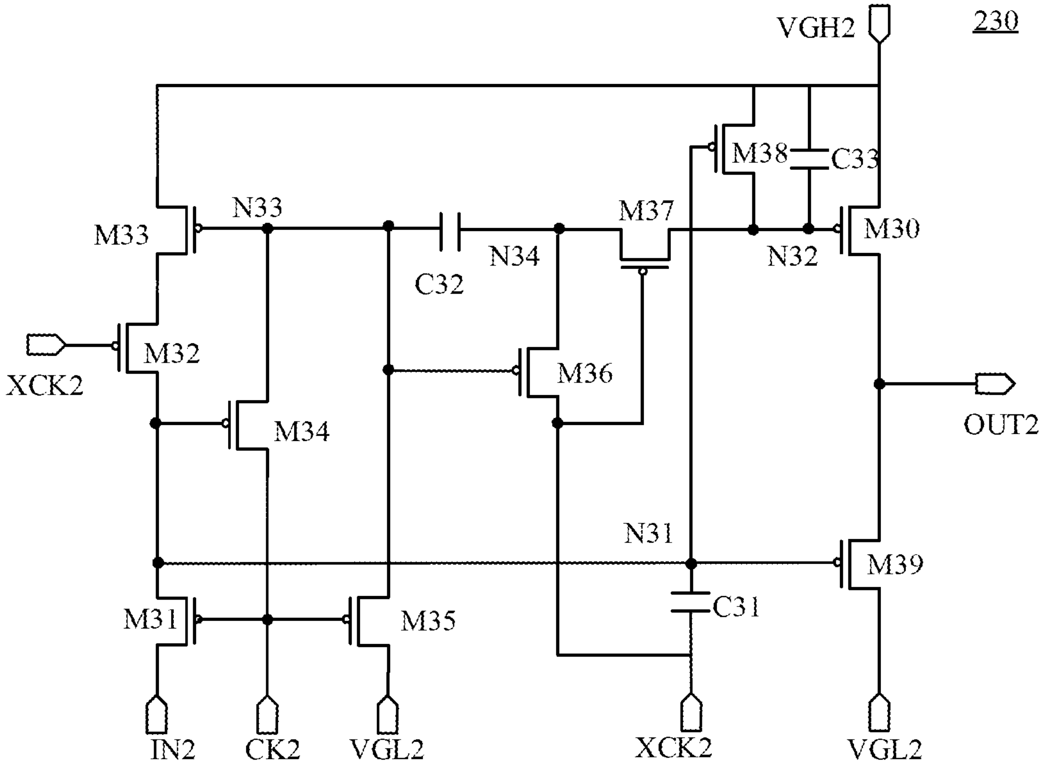
FIG. 17 is a schematic circuit diagram of a light-emitting driving unit according to an embodiment of the present disclosure.

As shown in FIG. 17, FIG. 17 is a schematic circuit diagram of a light-emitting driving unit according to an embodiment of the present disclosure. The light-emitting driving unit 230 includes a first transistor M31, a second transistor M32, a third transistor M33, a fourth transistor M34, a fifth transistors M35, a sixth transistor M36 and a seventh transistor M37, an eighth transistor M38, a ninth transistor M39, a tenth transistor M30, a first capacitor C31, a second capacitor C32, and a third capacitor C33.

A control electrode of the first transistor M31 is electrically connected to a first clock terminal CK2, a first terminal of the first transistor M31 is electrically connected to an input terminal IN2, and a second terminal of the first transistor M31 is electrically connected to a first node N31. Under control of a signal provided by the first clock terminal CK2, the first transistor M31 controls the input terminal IN2 to be electrically connected to the first node N31, to adjust a potential of the first node N31. A control electrode of the second transistor M32 is electrically connected to a second clock terminal XCK2, a first terminal of the second transistor M32 is electrically connected to the first node N31, and a second terminal of the second transistor M32 is electrically connected to a first terminal of the third transistor M33. A control electrode of the three transistors M33 is electrically connected to a third node N33, and a second terminal of the third transistor M33 is electrically connected to the input terminal IN2. Under control of a signal provided by the second clock terminal XCK2 and the third node N33, the second transistor M32 and the third transistor M33 control the input terminal IN2 to be electrically connected to the first node N31, to adjust the potential of the first node N31. A control electrode of the fourth transistor M34 is electrically connected to the first node N31, a first terminal of the fourth transistor M34 is electrically connected to the first clock terminal CK2, and a second terminal of the fourth transistor M34 is electrically connected to the third node N33. Under control of the first node N31, the fourth transistor M34 controls the first clock terminal CK2 to be electrically connected to the third node N33, to adjust a potential of the third node N33 through a signal of the first clock terminal CK2. A control electrode of the fifth transistor M35 is electrically connected to the first clock terminal CK2, a first terminal of the fifth transistor M35 is electrically connected to a first level terminal VGL2, and a second terminal of the fifth transistor M35 is electrically connected to the third node N33. Under control of a signal provided by the first clock terminal CK2, the fifth transistor M35 controls the first level terminal VGL2 to be electrically connected to the third node N33, to adjust the potential of the third node N33 through a signal of the first level terminal VGL2. A control electrode of the sixth transistor M36 is electrically connected to the third node N33, a first terminal of the sixth transistor M36 is electrically connected to the second clock terminal XCK2, and a second terminal of the sixth transistor M36 is electrically connected to a fourth node N34. Under control of the third node N33, the sixth transistor M36 controls the second clock terminal XCK2 to be electrically connected to the fourth node N34, to adjust a potential of the fourth node N34 through a signal of the second clock terminal XCK2. A control electrode of the seventh transistor M37 is electrically connected to the second clock terminal XCK2, a first terminal of the seventh transistor M37 is electrically connected to the fourth node N34, and a second terminal of the seventh transistor M37 is electrically connected to the second node N32. Under control of a signal provided by the second clock terminal XCK2, the seventh transistor M37 controls the fourth node N34 to be electrically connected to the second node N32, to adjust a potential of the second node N32 through a signal of the fourth node N34. A control electrode of the eighth transistor M38 is electrically connected to the first node N31, a first terminal of the eighth transistor M38 is electrically connected to the second level terminal VGH2, and a second terminal of the eighth transistor M38 is electrically connected to the second node N32. Under control of the first node N31, the eighth transistor M38 controls the second level terminal VGH2 to be electrically connected to the second node N32, to adjust the potential of the second node N32 through a signal of the second level terminal VGH2. A control electrode of the ninth transistor M39 is electrically connected to the first node N31, a first terminal of the ninth transistor M39 is electrically connected to the first level terminal VGL2, and a second terminal of the ninth transistor M39 is electrically connected to an output terminal OUT2. Under control of the first node N31, the ninth transistor M39 controls the first level terminal VGL2 to be electrically connected to the output terminal OUT2, to adjust an output signal of the output terminal OUT2 through the first level terminal VGL2. A control electrode of the tenth transistor M30 is electrically connected to the second node N32, a first terminal of the tenth transistor M30 is electrically connected to the second level terminal VGH2, and a second terminal of the tenth transistor M30 is electrically connected to the output terminal OUT2. Under control of the second node N32, the tenth transistor M30 controls the second level terminal VGH2 to be electrically connected to the output terminal OUT2, to adjust an output signal of the output terminal OUT2 through the second level terminal VGH2.

A first terminal of the first capacitor C31 is electrically connected to the first node N31, and a second terminal of the first capacitor C31 is electrically connected to the second clock terminal XCK2. A first terminal of the second capacitor C32 is electrically connected to the third node N33, and a second terminal of the second capacitor C32 is electrically connected to the fourth node N34. A first terminal of the third capacitor C33 is electrically connected to the second level terminal VGH2, and a second terminal of the third capacitor C33 is electrically connected to the second node N32.

The first level terminal VGL2 is used for transmitting a signal for turning on the first light-emitting control transistor M16 in the above-mentioned pixel driving circuit 100. The second level terminal VGH2 is used to transmit a signal for turning off the first light-emitting control transistor M16 in the above-mentioned pixel driving circuit 100. Exemplarily, in a case where the first light-emitting control transistor M16 is a P-type transistor, the first level terminal VGL2 receives a low-level signal VGL, and the second level terminal VGH2 receives a high-level signal VGH.

In an embodiment of the present disclosure, the display panel further includes B types of second level signal lines. The B types of second level signal lines are respectively electrically connected to the second-level terminals VGH2 of the B levels light-emitting driving units 230 in a same light-emitting driving unit group 30. Exemplarily, each type of second level signal line is used to transmit a constant signal. The constant signal includes a signal capable of controlling the first light-emitting control transistor M16 of the corresponding pixel driving circuit 100 to be turned off. Magnitudes of the levels transmitted by the B types of second level signal lines are different from each other. Voltages of the levels transmitted by the M types of second level signal lines gradually decrease in a data writing order of the corresponding pixel driving circuits.

For example, the B light-emitting driving units 230 in a same light-emitting driving unit group 30 at least include a p-th level light-emitting driving unit 30_*p* and a q-th level light-emitting driving unit 30_*q*, where p and q are both integers, and $1 \le p < q \le B$. The B types of second level signal lines include a p-th type second level signal line and a q-th type second level signal line. The p-th type second level signal line is electrically connected to the second level terminal VGH2 of the p-th level light-emitting driving unit 30_*p*, and the q-th type second level signal line is electrically connected to the second level terminal VGH2 of the q-th level light-emitting driving unit 30_*q*. A voltage of the p-th type second level signal line is greater than a voltage of the q-th type second level signal line.

Taking B=2 as an example, as shown in FIG. 18, FIG. 18 is a schematic connection diagram of a light-emitting driving circuit according to an embodiment of the present disclosure. Two light-emitting driving unit groups 30 in the display panel are illustrated. An input terminal IN2 of a first stage light-emitting driving unit 230_1 in a first light-emitting driving unit group 30 is electrically connected to a light-emitting frame start signal line LS2, a first type second-level signal line LH21 is electrically connected to a second level terminal VGH2 of the first stage light-emitting driving unit 230_1. A second type second level signal line LH22 is electrically connected with a second level terminal VGH2 of a second stage light-emitting driving unit 230_2. A voltage of a signal provided by the first type second level signal line LH21 is greater than a voltage of a signal provided by the second type second level signal line LH22.

In some embodiments of the present disclosure, a parasitic capacitance is formed between the light-emitting control signal line, connecting the light-emitting driving unit 230 and the pixel driving circuit, and the first node N11 in the pixel driving circuit. A signal in the light-emitting control signal line connected to the pixel driving circuit 100 changes from a non-enable level (such as a high level) to an enable level (such as a low level), so that when the light-emitting element starts to emit light, signal transition in the corresponding light-emitting control signal line affects the potential of the first node N11 in the corresponding pixel driving circuit through the coupling, and the potential of the corresponding first node N11 becomes small. In some embodiments of the present disclosure, different light-emitting driving units 230 in a same light-emitting driving unit group 30 are respectively connected to different types of second level signal lines, and the voltages transmitted by different types of second level signal lines gradually decrease in a data writing order of the correspondingly pixel driving circuits. In this way, the first nodes in the pixel driving circuits in different pixel rows in a pixel group can generate different degrees of coupling with a light-emitting control signal when the first nodes enter a light-emitting phase, thereby compensating a difference between leakage durations of the first nodes in different pixel driving circuits.

An embodiment of the present disclosure also provide a method for driving a display panel. The display panel is already described in detail herein. FIG. 19 is a schematic diagram of a method for driving a display panel according to an embodiment of the present disclosure, and the method includes: controlling the data writing phase TW_101 of the first pixel driving circuit 101 to be prior to the data writing phase TW_102 of the second pixel driving circuit 102 in a display duration of a frame of an image; and in a case where the first pixel driving circuit 101 and the second pixel driving circuit 102 receive a same data voltage, controlling a potential $V_{N11}$ of the first node N11 in the first pixel driving circuit 101 after the data writing phase TW_101 of the first pixel driving circuit 101 to be greater than a potential $V_{N12}$ of the first node N11 in the second pixel driving circuit 102 after the data writing phase TW_102 of the second pixel driving circuit 102.

In some embodiments the method includes, in a case where the first pixel driving circuit 101 and the second pixel driving circuit 102 receive a same data voltage, after the data writing phase of the first pixel driving circuit 101 and the data writing phase of the second pixel driving circuit 102, that is, when the data writing transistor M11 of the first pixel driving circuit 101 and the data writing transistor M11 of the second pixel driving circuit 102 are turned off, by setting $V_{N11}>V_{N12}$ in the embodiments of the disclosure, a difference between a current leaking duration of the first node N11 in the first pixel driving circuit 101 and a current leaking duration of the first node N11 in the second pixel driving circuit 102 can be compensated or even eliminated. After entering a light-emitting phase, the potential of the first node N11 in the first pixel driving circuit 101 tends to be the same as the potential of the first node N11 in the second pixel driving circuit 102, which is beneficial to improve the brightness uniformity of light-emitting elements 200 driven by the first pixel driving circuit 101 and the second pixel driving circuit 102.

In some embodiments of the disclosure, with reference to FIG. 2, controlling $V_{N11}$ to be greater than $V_{N12}$ includes: controlling a turned-on duration of the data writing transistor M11 in the first pixel driving circuit 101 to be shorter than a turned-on duration of the data writing transistor M11 in the second pixel driving circuit 102.

In some embodiments of the disclosure, as shown in FIG. 1, the display panel further includes a second scanning driving circuit 22. The second scanning driving circuit 22 includes multiple cascaded second scanning driving unit groups 20. The second scanning driving unit group 20 includes B cascaded second scanning driving units 220. The B second scanning driving units 220 in a same second scanning driving unit group 20 at least include an m-th stage second scanning driving unit and an n-th stage second scanning driving unit, where m and n are both integers, and $1 \le m < n \le B$. An output terminal of the m-th stage second scanning driving unit is electrically connected to the data writing control terminal S1 of the first pixel driving circuit 101, and an output terminal of the n-th stage second scanning driving unit is electrically connected to the data writing control terminal S1 of the second pixel driving circuit 102.

As shown in FIG. 6 and FIG. 7, the second scanning driving unit 220 includes a clock terminal. The display panel further includes B types of clock signal lines. The B types of clock signal lines at least include an m-th type clock signal line and an n-th type clock signal line. The m-th type clock signal line is electrically connected to the clock terminal of the m-th stage second scanning driving unit, and the n-th type clock signal line is electrically connected to the clock terminal of the n-th stage second scanning driving unit. The controlling a turned-on duration of the data writing transistor M11 in the first pixel driving circuit 101 to be shorter than a turned-on duration of the data writing transistor M11 in the second pixel driving circuit 102 include: controlling a period of an effective level transmitted by the m-th type clock signal line to be smaller than a period of an effective level transmitted by the n-th type clock signal line.

In some embodiments of the disclosure, controlling $V_{N11}$ to be greater than $V_{N12}$ includes: controlling an on-state current of a data writing transistor M11 in the first pixel driving circuit 101 to be smaller than an on-state current of a data writing transistor M11 in the second pixel driving circuit 102.

In some embodiments of the disclosure, the data writing transistor M11 in each of the first pixel driving circuit 101 and the second pixel driving circuit 102 includes a P-type transistor. The controlling the on-state current of the data writing transistor M11 in the first pixel driving circuit 101 to be smaller than the on-state current of the data writing transistor M11 in the second pixel driving circuit 102 includes: controlling an effective level outputted by the second scanning driving unit 220 that is electrically connected to the first pixel driving circuit 101 to be greater than an effective level outputted by the second scanning driving unit 220 that is electrically connected to the second pixel driving circuit 102. In some embodiments, the data writing transistor M11 in each of the first pixel driving circuit 101 and the second pixel driving circuit 102 includes an N-type transistor, the controlling the on-state current of the data writing transistor M11 in the first pixel driving circuit 101 to be smaller than the on-state current of the data writing transistor M11 in the second pixel driving circuit 102 includes: controlling the effective level outputted by the second scanning driving unit 220 that is electrically connected to the first pixel driving circuit 101 to be smaller than an effective level outputted by the second scanning driving unit 220 that is electrically connected to the second pixel driving circuit 102.

The B cascaded second scanning driving units 220 in a same second scanning driving unit group 20 at least include an m-th stage second scanning driving unit 220 and an n-th stage second scanning driving unit 220, an output terminal of the m-th stage second scanning driving unit 220 is electrically connected to the data writing control terminal S1 of the first pixel driving circuit 101, an output terminal of the n-th stage second scanning driving unit 220 is electrically connected to the data writing control terminal S1 of the second pixel driving circuit 102. The second scanning driving unit 220 includes a clock terminal CK1, and the display panel includes an m-th type clock signal line and an n-th type clock signal line. The m-th type clock signal line is electrically connected to the clock terminal CK1 of the m-th stage second scanning driving unit 220, and the n-th type clock signal line is electrically connected to the clock terminal CK1 of the n-th stage second scanning driving unit 220.

In some embodiments of the disclosure, the data writing transistor M11 in each of the first pixel driving circuit 101 and the second pixel driving circuit 102 includes a P-type transistor, and the controlling an effective level outputted by the second scanning driving unit 220 electrically connected to the first pixel driving circuit 101 to be greater than an effective level outputted by the second scanning driving unit 220 electrically connected to the second pixel driving circuit 102 includes: controlling an effective level transmitted by the m-th type clock signal line to be greater than an effective level transmitted by the n-th type clock signal line.

In some embodiments of the disclosure, the data writing transistor M11 in each of the first pixel driving circuit 101 and the second pixel driving circuit 102 includes an N-type transistor, and the controlling an effective level outputted by the second scanning driving unit 220 electrically connected to the first pixel driving circuit 101 to be smaller than an effective level outputted by the second scanning driving unit 220 electrically connected to the second pixel driving circuit 102 includes: controlling an effective level transmitted by the m-th type clock signal line to be smaller than an effective level transmitted by the n-th type clock signal line.

An embodiment of the present disclosure further provides a method for driving a display panel. As shown in FIG. 20, FIG. 20 is a schematic diagram of another method for driving a display panel according to an embodiment of the present disclosure. The method includes: controlling the data writing phase TW_101 of the first pixel driving circuit 101 to be prior to the data writing phase TW_102 of the second pixel driving circuit 102 in the display duration of the one frame of the image; and in a case where the first pixel driving circuit 101 and the second pixel driving circuit 102 receive a same data voltage, controlling a current leaking speed $v_{N11}$ at the first node in the first pixel driving circuit 101 after the data writing phase TW_101 of the first pixel driving circuit 101 to be smaller than a current leaking speed $v_{N12}$ at the first node in the second pixel driving circuit 102 after the data writing phase TW_102 of the second pixel driving circuit 102.

In the method for driving a display panel provided by the embodiments of the present disclosure, in a case where the first pixel driving circuit 101 and the second pixel driving circuit 102 receive a same data voltage, after the data writing phase of the first pixel driving circuit 101 and the data writing phase of the second pixel driving circuit 102, that is, when the data writing transistor M11 of the first pixel driving circuit 101 and the data writing transistor M11 of the second pixel driving circuit 102 are turned off, by setting $v_{N11}<v_{N12}$ in the embodiments of the disclosure, a difference between the current leakage duration of the first node N11 in the first pixel driving circuit 101 and the current leakage duration of the first node N11 in the second pixel driving circuit 102 can be compensated or even eliminated. After entering a light-emitting phase, the potential of the first node N11 in the first pixel driving circuit 101 tends to be the same as the potential of the first node N11 in the second pixel driving circuit 102, which is beneficial to improve the brightness uniformity of light-emitting elements 200 driven by the first pixel driving circuit 101 and the second pixel driving circuit 102.

As shown in FIG. 16, the display panel can include a light-emitting driving circuit 23. The light-emitting driving circuit 23 includes multiple cascaded light-emitting driving unit groups 30. The light-emitting driving unit group 30 includes B cascaded light-emitting driving units 230. With reference to FIG. 17, the light-emitting driving unit 230 includes a second level terminal VGH2. The display panel further includes B types of second level signal lines. The B types of second level signal lines are respectively electrically connected to the second-level terminals VGH2 of the B stages of light-emitting driving units 230 in a same light-emitting driving unit group 30. Magnitudes of the levels transmitted by the B types of second level signal lines are different from each other. Voltages of the levels transmitted by the M types of second level signal lines gradually decrease in an order in which the corresponding pixel driving circuits connected to the M types of second level signal lines are written to data. For example, the B light-emitting driving units 230 in a same light-emitting driving unit group 30 at least include a p-th stage light-emitting driving unit and a q-th stage light-emitting driving unit; an output terminal of the p-th stage light-emitting driving unit is electrically connected to a light-emitting control terminal of the first pixel driving circuit, and an output terminal of the q-th stage light-emitting driving unit is electrically connected to a light-emitting control terminal of the second pixel driving circuit, where p and q are both integers, and $1 \leq p < q \leq B$. Correspondingly, the B types of second level signal lines at least include a p-th type second level signal line and a q-th type second level signal line, the p-th type second level signal line is electrically connected to the second level terminal of the p-th stage light-emitting driving unit, and the q-th type second level signal line is electrically connected to the second level terminal of the q-th stage light-emitting driving unit.

In some embodiments of the disclosure, controlling $v_{N11}$ to be smaller than $v_{N12}$ includes: controlling a voltage of the p-th type second level signal line to be greater than a voltage of the q-th type second level signal line.

Some embodiment of the present disclosure further provides a display device. FIG. 21 is a schematic diagram of a display device provided by an embodiment of the present disclosure. As shown in FIG. 21, the display device includes the above-mentioned display panel 1000. The structure of the display panel 1000 has been described in detail in the above-mentioned embodiments and is not repeated herein. The display device shown in FIG. 21 is only a schematic illustration, and the display device may be any electronic device with a display function, such as a mobile phone, a tablet computer, a notebook computer, an electronic paper book, or a television.

The above are only some exemplary embodiments of the present disclosure and are not intended to limit the present disclosure. Any modification, equivalent replacement, or improvement made within the principle of the present disclosure should be included in the scope of the present disclosure.

What is claimed is:

1. A display panel, comprising:

pixel groups, wherein each pixel group of the pixel groups comprises B pixel rows, where $B \geq 2$, and B is an integer; and each pixel row of the B pixel rows comprises pixel driving circuits, wherein each of the pixel driving circuits comprises a driving transistor, a data writing control terminal, and a first scanning control terminal, wherein the driving transistor comprises a control electrode electrically connected to a first node, and a first electrode electrically connected to a second node; and first scanning driving units, one of the first scanning driving units being electrically connected to the first scanning control terminals of the pixel driving circuits in one pixel group of the pixel groups, wherein a working cycle of each of the pixel driving circuits comprises a data writing phase, wherein, during the data writing phase, the data writing control terminal is configured to receive an effective level, and the one of first scanning driving units is configured to provide an effective level to the first scanning control terminals; and wherein the pixel driving circuits in one pixel group of the pixel groups comprise a first pixel driving circuit and a second pixel driving circuit, wherein in a display duration of a frame of an image, the data writing phase of the first pixel driving circuit is prior to the data writing phase of the second pixel driving circuit; and in a case where the first pixel driving circuit and the second pixel driving circuit receive a same data voltage, a potential $V_{N11}$ of the first node in the first pixel driving circuit after the data writing phase of the first pixel driving circuit is greater than a potential $V_{N12}$ of the first node in the second pixel driving circuit after the data writing phase of the second pixel driving circuit.

2. The display panel according to claim 1, wherein each of the pixel driving circuits further comprises a data writing transistor, wherein the data writing transistor comprises a control electrode electrically connected to the data writing control terminal, a first electrode electrically connected to a data voltage terminal, and a second electrode electrically connected to the second node; and in the display duration of the frame of the image, a turned-on duration of the data writing transistor in the first pixel driving circuit is shorter than a turned-on duration of the data writing transistor in the second pixel driving circuit.

3. The display panel according to claim 2, further comprising:

a second scanning driving circuit, wherein the second scanning driving circuit comprises second scanning driving unit groups that are cascaded, wherein each second scanning driving unit group of the second scanning driving unit groups comprises B second scanning driving units that are cascaded; the B second scanning driving units in one of the second scanning driving unit groups comprise an m-th stage second scanning driving unit and an n-th stage second scanning driving unit, where m and n are both integers, and $1 \le m < n \le B$, wherein an output terminal of the m-th stage second scanning driving unit is electrically connected to the data writing control terminal of the first pixel driving circuit, and an output terminal of the n-th stage second scanning driving unit is electrically connected to the data writing control terminal of the second pixel driving circuit;

the B second scanning driving units comprise a clock terminal of the m-th stage second scanning driving unit and a clock terminal of the n-th stage second scanning driving unit, and the display panel further comprises B types of clock signal lines, wherein the B types of clock signal lines comprise an m-th type clock signal line and an n-th type clock signal line, wherein the m-th type clock signal line is electrically connected to the clock terminal of the m-th stage second scanning driving unit, and the n-th type clock signal line is electrically connected to the clock terminal of the n-th stage second scanning driving unit; and a pulse width of an effective level transmitted by the m-th type clock signal line is smaller than a pulse width of an effective level transmitted by the n-th type clock signal line.

4. The display panel according to claim 2, further comprising:

a second scanning driving circuit, wherein the second scanning driving circuit comprises second scanning driving units that are cascaded, wherein each of the second scanning driving units is electrically connected to the data writing control terminal of one of the pixel driving circuits;

each of the second scanning driving units comprises a first output transistor configured to electrically connect an output terminal of the second scanning driving unit and a clock terminal; and a width to length ratio of a channel of the first output transistor of one of the second scanning driving units that is electrically connected to the first pixel driving circuit is W11/L11, and a width to length ratio of a channel of the first output transistor of one of the second scanning driving units that is electrically connected to the second pixel driving circuit is W21/L21, wherein W11/L11<W21/L21.

5. The display panel according to claim 1, wherein an on-state current of a data writing transistor in the first pixel driving circuit is smaller than an on-state current of a data writing transistor in the second pixel driving circuit.

6. The display panel according to claim 5, further comprising:

a second scanning driving circuit, wherein the second scanning driving circuit comprises second scanning driving unit groups that are cascaded, wherein each second scanning driving unit group of the second scanning driving unit groups comprises B second scanning driving units that are cascaded, wherein one of the B second scanning driving units is electrically connected to the data writing control terminal of one of the pixel driving circuits; and the data writing transistor comprises a P-type transistor, and an effective level outputted by one of the B second scanning driving units that is electrically connected to the first pixel driving circuit is greater than an effective level outputted by one of the B second scanning driving units that is electrically connected to the second pixel driving circuit; or the data writing transistor comprises an N-type transistor, and an effective level outputted by one of the B second scanning driving units that is electrically connected to the first pixel driving circuit is smaller than an effective level outputted by one of the B second scanning driving units that is electrically connected to the second pixel driving circuit.

7. The display panel according to claim 6, wherein the B second scanning driving units in one second scanning driving unit group of the second scanning driving unit groups comprise an m-th stage second scanning driving unit and an n-th stage second scanning driving unit, wherein an output terminal of the m-th stage second scanning driving unit is electrically connected to the data writing control terminal of the first pixel driving circuit, and an output terminal of the n-th stage second scanning driving unit is electrically connected to the data writing control terminal of the second pixel driving circuit, where m and n are both integers, and $1 \le m < n \le B$;

the B second scanning driving units comprise a clock terminal of the m-th stage second scanning driving unit and a clock terminal of the n-th stage second scanning driving unit, and the display panel further comprises B types of clock signal lines, wherein the B types of clock signal lines comprise an m-th type clock signal line and an n-th type clock signal line, wherein the m-th type clock signal line is electrically connected to the clock terminal of the m-th stage second scanning driving unit, and the n-th type clock signal line is electrically connected to the clock terminal of the n-th stage second scanning driving unit; and the data writing transistor comprises a P-type transistor, and an effective level transmitted by the m-th type clock signal line is greater than an effective level transmitted by the n-th type clock signal line; or the data writing transistor comprises an N-type transistor, and an effective level transmitted by the m-th type clock signal line is smaller than an effective level transmitted by the n-th type clock signal line.

8. The display panel according to claim 7, wherein the B second scanning driving units further comprise a first level terminal of the m-th stage second scanning driving unit and a first level terminal of the n-th stage second scanning driving unit, and the display panel further comprises B types of first level signal lines, wherein the B types of first level signal lines comprise an m-th type first level signal line and an n-th type first level signal line, wherein the m-th type first level signal line is electrically connected to the first level terminal of the m-th stage second scanning driving unit, and the n-th type first level signal line is electrically connected to the first level terminal of the n-th stage second scanning driving unit; and the data writing transistor comprises a P-type transistor, and a level transmitted by the m-th type first level signal line is greater than a level transmitted by the n-th type first level signal line; or the data writing transistor comprises an N-type transistor, and a level transmitted by the m-th type first level signal line is smaller than a level transmitted by the n-th type first level signal line.

9. A display device comprising the display panel according to claim 1.

10. A method for driving a display panel, wherein the display panel comprises:

pixel groups, wherein each pixel group of the pixel groups comprises B pixel rows, where B≥2, and B is an integer, wherein each pixel row of the B pixel rows comprise pixel driving circuits, wherein each of the pixel driving circuits comprises a driving transistor, a data writing control terminal, and a first scanning control terminal, wherein the driving transistor comprises a control electrode electrically connected to a first node, and a first electrode electrically connected to a second node; and first scanning driving units, one of the first scanning driving units being electrically connected to the first scanning control terminals of the pixel driving circuits in one pixel group of the pixel groups, wherein a working cycle of each of the pixel driving circuits comprises a data writing phase, wherein, during the data writing phase, the data writing control terminal is configured to receive an effective level and the one of the first scanning driving units is configured to provide an effective level; and the pixel driving circuits in one pixel group of the pixel groups comprise a first pixel driving circuit and a second pixel driving circuit; and the method comprises:

in the display duration of the one frame of the image, controlling the data writing phase of the first pixel driving circuit to be prior to the data writing phase of the second pixel driving circuit; and in a case where the first pixel driving circuit and the second pixel driving circuit receive a same data voltage, controlling a potential $V_{N11}$ of the first node in the first pixel driving circuit after the data writing phase of the first pixel driving circuit to be greater than a potential $V_{N12}$ of the first node in the second pixel driving circuit after the data writing phase of the second pixel driving circuit.

11. The method according to claim 10, wherein each of the pixel driving circuits further comprises a data writing transistor, wherein the data writing transistor comprises a control electrode electrically connected to the data writing control terminal, a first electrode electrically connected to a data voltage terminal, and a second electrode electrically connected to the second node; and wherein said controlling $V_{N11}$ to be greater than $V_{N12}$ comprises:

controlling a turned-on duration of the data writing transistor in the first pixel driving circuit to be shorter than a turned-on duration of the data writing transistor in the second pixel driving circuit.

12. The method according to claim 11, wherein the display panel further comprises a second scanning driving circuit, wherein the second scanning driving circuit comprises second scanning driving unit groups that are cascaded, wherein each second scanning driving unit group of the second scanning driving unit groups comprises B second scanning driving units that are cascaded; the B second scanning driving units in one second scanning driving unit group of the second scanning driving unit groups comprise an m-th stage second scanning driving unit and an n-th stage second scanning driving unit, where m and n are both integers, and 1≤m<n≤B, wherein an output terminal of the m-th stage second scanning driving unit is electrically connected to the data writing control terminal of the first pixel driving circuit, and an output terminal of the n-th stage second scanning driving unit is electrically connected to the data writing control terminal of the second pixel driving circuit;

wherein the B second scanning driving units comprise a clock terminal of the m-th stage second scanning driving unit and a clock terminal of the n-th stage second scanning driving unit, and the display panel further comprises B types of clock signal lines, wherein the B types of clock signal lines comprise an m-th type clock signal line and an n-th type clock signal line, wherein the m-th type clock signal line is electrically connected to the clock terminal of the m-th stage second scanning driving unit, and the n-th type clock signal line is electrically connected to the clock terminal of the n-th stage second scanning driving unit; and wherein said controlling the turned-on duration of the data writing transistor in the first pixel driving circuit to be shorter than the turned-on duration of the data writing transistor in the second pixel driving circuit comprises:

controlling a period of an effective level transmitted by the m-th type clock signal line to be shorter than a period of an effective level transmitted by the n-th type clock signal line.

13. The method according to claim 10, wherein said controlling $V_{N11}$ to be greater than $V_{N12}$ comprises:

controlling an on-state current of a data writing transistor in the first pixel driving circuit to be smaller than an on-state current of a data writing transistor in the second pixel driving circuit.

14. The method according to claim 13, wherein the display panel further comprises a second scanning driving circuit, wherein the second scanning driving circuit comprises second scanning driving unit groups that are cascaded, wherein each second scanning driving unit group of the second scanning driving unit groups comprises B second scanning driving units that are cascaded; and in a case where the data writing transistor comprises a P-type transistor, said controlling the on-state current of the data writing transistor in the first pixel driving circuit to be smaller than the on-state current of the data writing transistor in the second pixel driving circuit comprises: controlling an effective level outputted by one of the second scanning driving units that is electrically connected to the first pixel driving circuit to be greater than an effective level outputted by one of the second scanning driving units that is electrically connected to the second pixel driving circuit; or in a case where the data writing transistor comprises an N-type transistor, said controlling the on-state current of the data writing transistor in the first pixel driving circuit to be smaller than the on-state current of the data writing transistor in the second pixel driving circuit comprises: controlling an effective level outputted by one of the second scanning driving units that is electrically connected to the first pixel driving circuit to be smaller than an effective level outputted by one of the second scanning driving units that is electrically connected to the second pixel driving circuit.

15. The method according to claim 14, wherein the B second scanning driving units in one second scanning driving unit group of second scanning driving unit groups comprise an m-th stage second scanning driving unit and an n-th stage second scanning driving unit, wherein an output terminal of the m-th stage second scanning driving unit is electrically connected to the data writing control terminal of the first pixel driving circuit, and an output terminal of the n-th stage second scanning driving unit is electrically connected to the data writing control terminal of the second pixel driving circuit, where m and n are both integers, and $1 \leq m < n \leq B$;

the B second scanning driving units comprise a clock terminal of the m-th stage second scanning driving unit and a clock terminal of the n-th stage second scanning driving unit, and the display panel further comprises B types of clock signal lines, wherein the B types of clock signal lines comprise an m-th type clock signal line and an n-th type clock signal line, wherein the m-th type clock signal line is electrically connected to the clock terminal of the m-th stage second scanning driving unit, and the n-th type clock signal line is electrically connected to the clock terminal of the n-th stage second scanning driving unit; and in the case where the data writing transistor comprises the P-type transistor, said controlling the effective level outputted by the one of the second scanning driving units that is electrically connected to the first pixel driving circuit to be greater than the effective level outputted by the one of the second scanning driving units that is electrically connected to the second pixel driving circuit comprises: controlling an effective level transmitted by the m-th type clock signal line to be greater than an effective level transmitted by the n-th type clock signal line; and in the case where the data writing transistor comprises the N-type transistor, controlling the effective level outputted by the one of the second scanning driving units that is electrically connected to the first pixel driving circuit to be smaller than the effective level outputted by the one of the second scanning driving units that is electrically connected to the second pixel driving circuit comprises: controlling an effective level transmitted by the m-th type clock signal line to be smaller than tan effective level transmitted by the n-th type clock signal line.

* * * * *